United States Patent
Zhao et al.

(10) Patent No.: US 8,082,892 B2
(45) Date of Patent: *Dec. 27, 2011

(54) HIGH EFFICIENCY INTEGRATED HEAT ENGINE-2 (HEIHE-2)

(75) Inventors: Yuanping Zhao, San Jose, CA (US); Yuanfan Zhao, Kunming (CN); Yuanjun Zhao, Kunming (CN); Yiheng Zhao, New York, NY (US); Biyun Zhou, San Jose, CA (US)

(73) Assignees: Yuanping Zhao, San Jose, CA (US); Biyun Zhou, San Jose, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/242,535

(22) Filed: Sep. 30, 2008

(65) Prior Publication Data
US 2009/0056670 A1 Mar. 5, 2009

Related U.S. Application Data

(60) Provisional application No. 60/979,052, filed on Oct. 10, 2007.

(51) Int. Cl.
*F02B 47/02* (2006.01)

(52) U.S. Cl. ......... 123/25 P; 123/25 R; 123/26; 60/524; 60/525

(58) Field of Classification Search ............... 123/25 P, 123/25 R, 58.8, 568.13; 60/524, 525
See application file for complete search history.

(56) References Cited

U.S. PATENT DOCUMENTS

| | | | | |
|---|---|---|---|---|
| 2,671,311 A | * | 3/1954 | Rohrbach | 123/25 R |
| 3,842,808 A | * | 10/1974 | Cataldo | 123/25 P |
| 6,543,225 B2 | * | 4/2003 | Scuderi | 60/597 |
| 6,817,182 B2 | * | 11/2004 | Clawson | 60/670 |
| 7,062,915 B2 | * | 6/2006 | Clawson | 60/670 |
| 2002/0194850 A1 | * | 12/2002 | Zaleski | 60/698 |
| 2006/0124079 A1 | * | 6/2006 | Singh | 123/25 C |
| 2007/0022977 A1 | * | 2/2007 | Crower | 123/25 C |
| 2008/0127933 A1 | * | 6/2008 | Blumberg et al. | 123/304 |

OTHER PUBLICATIONS

Ron Graves, Stretch Efficiency in Combustion Engines with Implications of New Combustion Regimes, Chapter II.1, FY 2006 Progress Report on Advanced Combustion Engine Technologies, Department of Energy, 2007. Posted at: http://www1.eere.energy.gov/vehiclesandfuels/pdfs/adv_engine_2006/2006_advanced_engine_2-1.pdf.

* cited by examiner

*Primary Examiner* — Michael Cuff
*Assistant Examiner* — Long T Tran

(57) ABSTRACT

The present invention is a second kind of High Efficiency Integrated Heat Engine, or HEIHE-2 for short. HEIHE-2 is a reciprocal combustion engine integrated with both compound cycle and combined cycle. HEIHE-2 comprises triple compound cylinder structure, with the first cylinder and the second cylinder being the primary combustion and/or expansion cylinders; and the third cylinder being the secondary combustion and/or expansion cylinder. Power strokes driven by expansions of different working fluids such as air-fuel combustion products, steam and compressed air, are integrated into one engine block. Triple cylinder structure provides compound expansions of three (3) different fluids as to recover the energies that would be lost with the exhaust fluids or during braking. All of these make HEIHE-2 work around four (4) periods with six (6) different operation strokes. All four (4) working periods contain four (4) different power strokes but only two (2) of them consume the fuel. Thus the fuel conversion efficiency could be greatly increased, or even be doubled comparing with the conventional internal combustion engine (ICE).

20 Claims, 26 Drawing Sheets

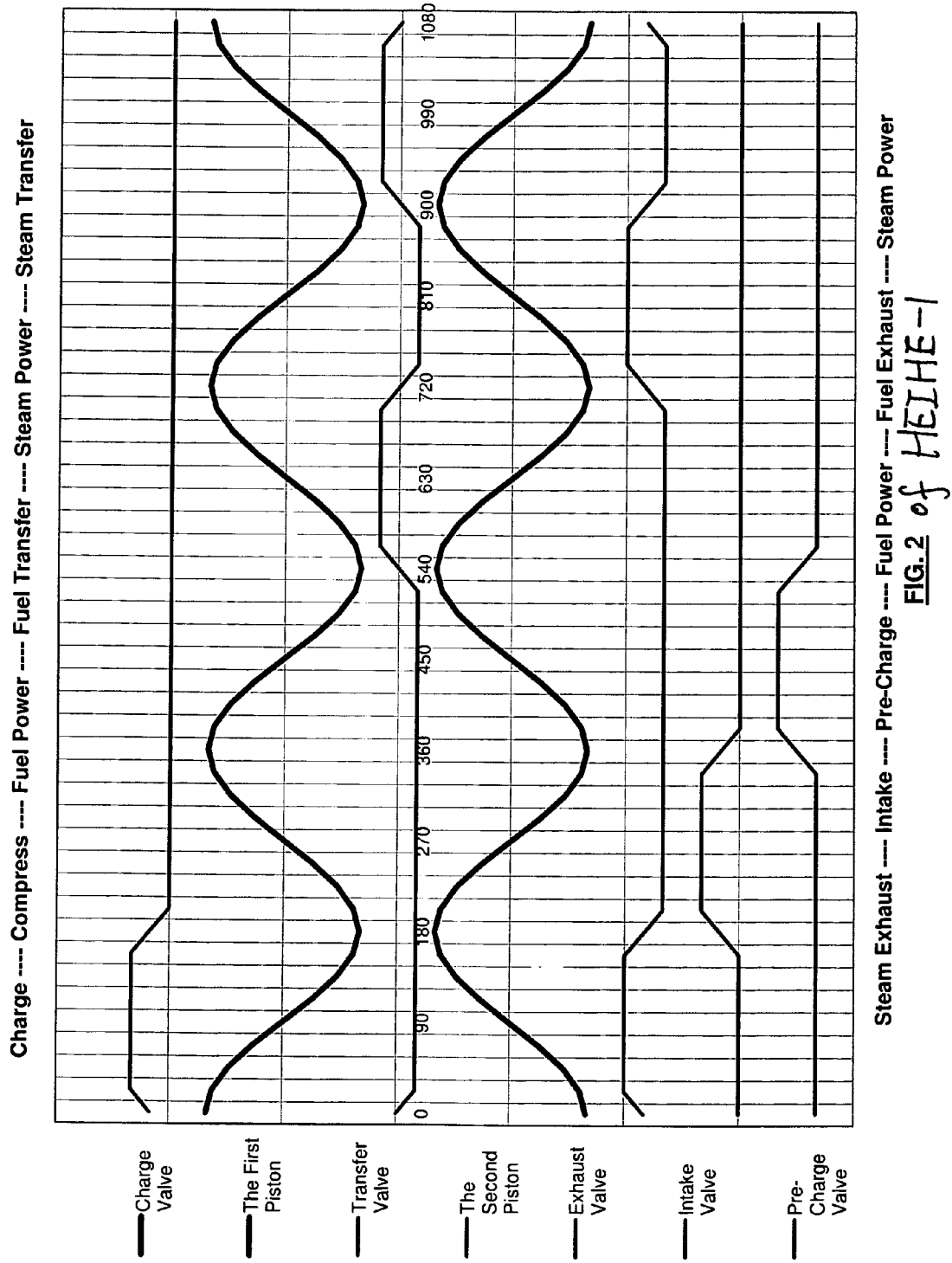

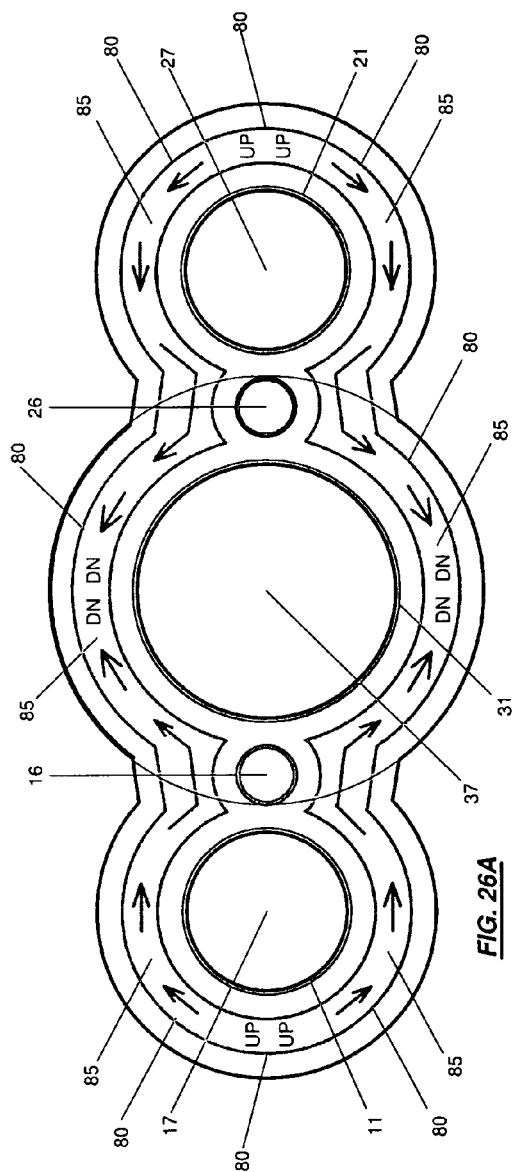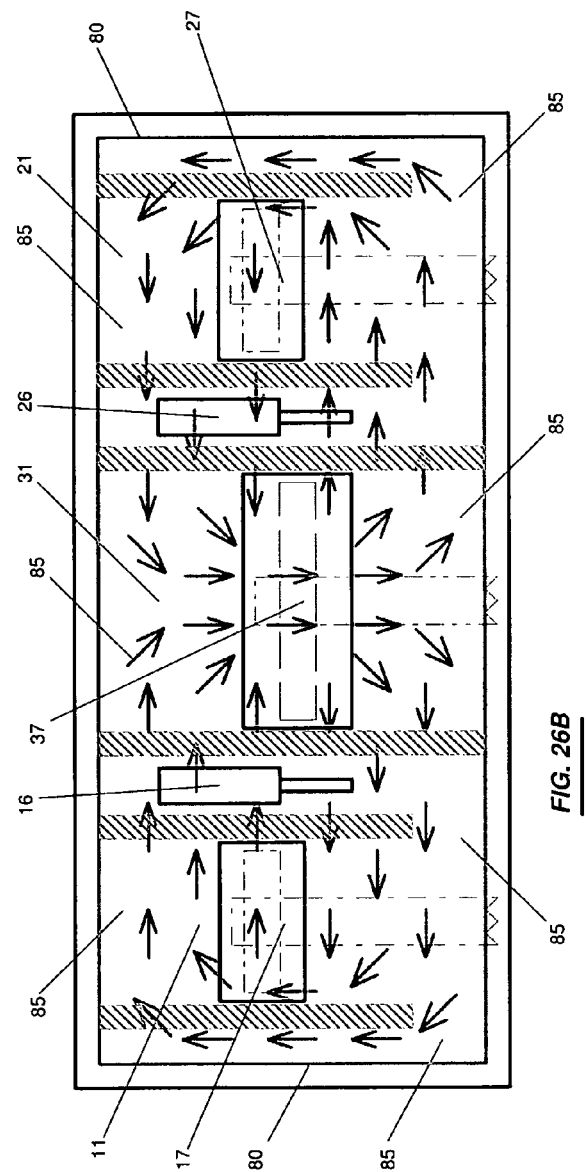
FIG. 26A
FIG. 26B
FIG. 26

High Efficiency Integrated Heat Engine-2 (HEIHE-2) Fuel Conversion Efficiency Summary    9/30/2007

| No. | ITEM NAME | FEATURE & BENEFIT | Lower Gain % | Minimum Efficiency % | Higher Gain % | Maximum Efficiency % | Average Efficiency % |
|---|---|---|---|---|---|---|---|
| 1 | Primary Fuel Combustion Expansion | Baseline from Conventional Gasoline ICE | 100 | 25.00 | 100 | 30.00 | 27.50 |
| 2 | Secondary Fuel Combustion Expansion | Over-Expanded Compound Power Stroke | 16 | 4.00 | 20 | 6.00 | 5.00 |
| 3 | Combined Working Fluids Expansion | Secondary Combined Fluids Power Stroke | 30 | 7.50 | 36 | 10.80 | 9.15 |
| 4 | Removed Water Pump and Radiator | Cylinder Internal Fluid plus External Cooling | | 2.00 | | 3.00 | 2.50 |
| 5 | Exhaust Actuated Valves (EAV) | Camless, Low power, Harvest Energy | | 2.00 | | 3.00 | 2.50 |
| 6 | Variable Compression Ratio | Power Density, Multiple Fuel Compatible | | 2.00 | | 3.00 | 2.50 |
| 7 | Air Hybrid Braking Power Regeneration | Integrated Air / Heat Storage, No Starter | 15 | 3.75 | 25 | 7.50 | 5.63 |
| 8 | In-Cylinder Catalytic Meshes | Harness Catalytic Convention Energy | | 1.00 | | 2.00 | 1.50 |
| 9 | Inner-Jacket Fluid Super-Heater | Recycle Heat Loss from Cylinder Wall | | 1.00 | | 2.00 | 1.50 |
| 10 | Engine Body/Piston Thermal Insulation | Reduced Heat Loss | | 1.00 | | 2.00 | 1.50 |
| 11 | TOTAL Efficiency from HEIHE-2 | High Efficiency Integrated Heat Engine-2 | % | 49.25 | | 69.30 | 59.28 |
| 12 | TOTAL Efficiency Gain Ratio | High Efficiency Integrated Heat Engine-2 | Times | 1.97 | | 2.31 | 2.14 |
| 13 | TOTAL Efficiency Percentage Gain | High Efficiency Integrated Heat Engine-2 | % | 97.00 | | 131.00 | 114.00 |

FIG. 27

HIGH EFFICIENCY INTEGRATED HEAT ENGINE-2 (HEIHE-2)

RELATED PATENT APPLICATION

This application claims the benefit of priority of U.S. Provisional Application No. 60/979,052 filed on Oct. 10, 2007, entitled "High Efficiency Integrated Heat Engine-2" and which is incorporated in its entirety herein.

This patent application is also a continuation in part of our co-pending U.S. patent application Ser. No. 12/200,251, filed on Aug. 28, 2008, entitled "High Efficiency Integrated Heat Engine (HEIHE)", which claims the benefit of priority of U.S. Provisional Application No. 60/968,714 filed on Aug. 29, 2007.

FIELD OF THE INVENTION

The present invention relates to high efficiency heat engine with compound cycle and combined cycle, particularly to internal combustion engine integrated with multiple power strokes from triple compound cylinders and multiple working fluids such as air-fuel combustion products, steam and compressed air.

BACKGROUND OF THE INVENTION

Internal combustion engine (ICE) was invented in 1876. Its typical four-stroke reciprocal piston configuration is still the primary engine format today. Modern gasoline ICE has 25% to 30% fuel conversion efficiency. This means that only 25% to 30% of the energy in the consumed fuel is converted into mechanical power, while the rest is lost through friction and heat. Due to millions of ICE currently in use worldwide, the improvement in ICE fuel conversion efficiency will have huge impacts on energy consumption, fuel economy, fuel reserve, dependency on foreign oil, and the environment.

ICE causes air pollution by discharging emission gases. The emissions from millions of vehicles combine with sunshine and moisture to produce greenhouse effect. Although governments continue to pass through anti-pollution laws, automobile manufacturers are designing new vehicles with improved emissions, and oil companies are changing their formulations to burn more clearly, dangerous emissions from vehicles still remain an environment problem.

One of the major content of ICE exhaust is carbon dioxide, which contributes to global warming. The increasing density of carbon dioxide traps the solar heat, causing the atmosphere temperatures to rise, leading to violent weather patterns and the melting of polar icecaps.

The best way to reduce carbon dioxide emissions is to burn less fossil fuel by using engines with higher efficiency. Even when we enter the era of biofuels and/or alternative fuels, or hydrogen fuels finally, increasing fuel conversion efficiency and reducing fuel consumption is still a significant strategic solution, because the higher the fuel costs, the higher the engine efficiency is expected.

It is believed that much of benefit would come from fuel efficiency improvement. A 10% efficiency improvement in vehicle performance would save over $10 billion of US dollars and reduce emissions of carbon dioxide by 140 million tons per year. A 20% efficiency improvement could reduce foreign oil used today by one-third. Environmentalists claim that increasing the average vehicle mileage to 40 MPG would save more oil than we get from Persian Gulf imports, the Arctic Wildlife Refuge and California offshore drilling combined. Consumers would save billions of dollars in fuel costs. Reduction in emissions would be in the hundreds of millions of tons per year, and dependency on foreign oil would be drastically reduced.

Therefore, a new kind of heat engine, with much higher fuel conversion efficiency, is desired that addresses the immediate and specific needs of reducing fossil fuel consumption, reducing greenhouse gas discharge and reducing combustion exhaust emissions.

Despite immense efforts over the past 100 years, engine fuel conversion efficiency has no major improvement both theoretically and practically. Around academic field of ICE, Homogeneous Charge Compression Ignition (HCCI) is a well-known theory that it was referred as a hopeful ICE solution, and was being studied extensively. But little progress was achieved during the past decades, nor has its practical utilization been found. Until recently, top US academic authority turns to promote Heterogeneous Combustion and Staged Combustion adversely. This could be a fact that fully turns HCCI down. Wondering back and forth theoretically, more fails than success, ICE has suffered the lack of significant progress in practice over the past centenary.

However, it is not impossible to improve fuel conversion efficiency of heat engine. During 19th century, a steam engine with an efficiency of 6% to 7% was referred as high efficient. Not until the middle of 20th century, when steam engine was almost being replaced by ICE, a French mechanical engineer called Andre Chapelon was able to obtain 13% efficiency by thermodynamically modifying steam engine with compound cylinders and super-reheating. This could be a historical fact that the engine efficiency can be doubled. Modern late 20th century power plants utilizing combined heat-work conversion cycles could yield an overall thermal efficiency as high as 60%, where different working fluids drive different power cycles, obtaining a combined thermal efficiency from each of the individual power cycles. This could be another evidence that engine efficiency could be doubled from the current 30% from conventional ICE. All of these could be the clues that lead to engine fuel conversion efficiency improvement. Based on such an inventive thinking, we could foresee that the challenge and chance of the 21st century engine revolution is waving to us.

PRIOR ART

Early in 1954, Switzerland inventor Hans Rohrbach disclosed a design idea that injects liquid water into the combustion chamber of diesel engine in his U.S. Pat. No. 2,671,311. This idea makes conventional four-stroke engine into six-stroke by injecting liquid water into the combustion chamber after fuel exhaust stroke, causing additional steam expansion stroke and steam exhaust stroke. Obviously, this kind of extra steam expansion stroke would increase engine fuel conversion efficiency. This invention even has external steam condensing and recirculation facility that recycles expanded steam exhaust. Its brilliant design idea of multiple working fluid combined heat-work conversion cycles could be a useful treasure in ICE industry. Unfortunately, this great invention has not yet been put into practice as of today.

Not until 2006, US inventor Bruce Brower physically implemented the first working sample of six-stroke engine with combustion chamber water injection, and published his idea with US Patent Publication No. 20070022977. Based on his experiment, it is believed that six-stroke engine with combustion chamber water injection could obtain a gain of 40% in efficiency over conventional ICE.

US Patent Publication No. 20060124079 is also based on six-stroke engine with water injection, yet it is even integrated with a hot gas turbine for waste heat recovery. However, the separated power shafts between the engine and the gas turbine would make the integration lack of perfection. As a result, the gas turbine output could hardly be merged with engine output.

U.S. Pat. No. 6,543,225 (equivalent Chinese Patent No. ZL02814537.2) filed by US inventor Carmelo Scuderi disclosed a four-stroke engine with split cycles. This invention divides conventional four ICE strokes into a twin cylinder structure, in order to improve the effective angle of air-fuel combustion and expansion, as to match it with mechanical torque angle of the engine. Although twin cylinder structure has been utilized, it bears no compound secondary combustion and expansion theorem. Mechanically and structurally, this invention looks like a two-stroke engine combined with a supercharge pump.

U.S. patent application Ser. No. 12/200,251 filed on Aug. 28, 2008 presents a twin cylinder version of the present invention. It discloses all the basic concepts and structure of HEIHE, and provides even more features and efficiency contributors than the present invention. However, lower power density issue would make it less attractive. In order to solve its lower power density problem, a new structure of sharing one common secondary cylinder between two primary cylinders has been defined. That is the triple cylinder structure disclosed in the present invention.

BRIEF SUMMARY OF THE INVENTION

The present invention is a second kind of High Efficiency Integrated Heat Engine, or HEIHE-2 for short. HEIHE-2 is a reciprocal combustion engine integrated with both compound cycle and combined cycle. HEIHE-2 comprises triple compound cylinder structure, with the first cylinder and the second cylinder being the primary combustion and/or expansion cylinders; and the third cylinder being the secondary combustion and/or expansion cylinder. Power strokes driven by expansions of different working fluids such as air-fuel mixture, steam and compressed air, are integrated into one engine block. Triple cylinder structure provides compound expansions of three (3) different fluids as to recover the energies that would be lost with the exhaust fluids or during braking. All of these make HEIHE-2 work around four (4) periods with six (6) different operation strokes. Among (4) working periods involved, all four (4) periods contain four (4) different power strokes but only two (2) of the power strokes consume the fuel. Thus the fuel conversion efficiency could be greatly increased, or even be doubled comparing with the conventional internal combustion engine (ICE).

The following two (2) kinds of power strokes are involved in compound cycle and combined cycle of HEIHE-2:

1] Primary power stroke—Primary air-fuel combustion and combustion products expansion in either the first cylinder or the second cylinder. This is the baseline power stroke, being the same as the one happened in conventional ICE; and 2] Secondary power stroke—Secondary air-fuel combustion and combustion products expansion in the third cylinder; plus steam generation and/or working fluid injection into either the first cylinder or the second cylinder, being combined with and heated by air-fuel combustion products; and combined working fluids expansion in the third cylinder.

Fluid injection is a critical procedure for HEIHE-2 operation. Normally, liquid water is a major fluid for injection in a multiple working fluid engine. However, water is such a fluid that requires very large evaporating heat to change the phase in physics that it absorbs the waste heat, reduces cylinder temperature but does not provide enough expansion for mechanical work. Therefore, this inventor is considering of utilizing compressed air as a second fluid for injection. Such kind of fluid is hardly corrosive, yet it does not have to change phase before making expansion; and its specific heat is close to that of combustion products, the first engine fluid to be combined with inside the engine cylinders, resulting an even, smooth heat exchange between two fluids. The result could be better fluid expansion, thus generating more available mechanical work based on waste heat recovery.

Another working fluid to replace liquid water as fluid for injection could be compressed steam. Compressed steam actually is one kind of saturated water-steam mixture with super-heated temperature and under high pressure. It contains energy and could be used as a thermal energy storage fluid that could be obtained from converting and collecting other low quality heat energy sources such as geothermal, solar, trash or waste heat.

Beside the above two (2) kinds of power strokes, other efficiency improving features are also integrated into HEIHE-2:

1] Removed cooling/radiator system. Due to the internal fluid cooling effect by fluid injection into combustion chamber and external thermal convention effect by inter-cylinder heat conveying fluid jacket, external cooling system that is a must to a conventional ICE could no longer be required. Thus the weights of radiator and water pump could be removed, and the mechanical power consumed by water pump would be eliminated.

2] Exhaust Actuated Valves (EAV). EAV is exhaust discharge valve driven by exhaust pneumatic pressure instead of by engine mechanical power, making use of the remaining energy from the exhaust gases.

3] Variable Compression Ratio (VCR). VCR would make changing compression ratio possible during the operation according to the varying load. Higher compression ratio would result in higher fuel conversion efficiency and higher power density. VCR also makes HEIHE-2 multiple fuels compatible.

4] Braking power regeneration by compressed air, or pneumatic hybrid. During the process of vehicle deceleration and/or braking, HEIHE-2 would work in air compressor (AC) mode, converting vehicle's kinetic energy into the stored pneumatic energy and stored thermal energy respectively. During the process of vehicle acceleration and/or starting, HEIHE-2 would work in compressed air engine (CAE) mode, converting the stored pneumatic energy and stored thermal energy into mechanical power that starts and drives the vehicle, eliminating engine starter and its cranking power storage.

5] In-cylinder catalytic meshes.

(a) In the first cylinder and the second cylinder, built-in catalytic meshes are utilized to enhance the process of steam cracking into hydrogen and oxygen under high temperature of combustion chamber, and also to enhance the process of steam cracking and/or hydrocracking of unburned hydrocarbons. All of these cracking processes would result combustible gases that carry heat energy.

(b) In the third cylinder, built-in catalytic mesh is utilized to promote the secondary combustion of air-fuel combustion products, or to further promote exhaust oxidation with fresh air, as to reduce exhaust emissions while harnessing heat energy released from the secondary combustion of air-fuel combustion products. All of those cracking processes happened in the first cylinder and the second cylinder could also be repeated here in the third cylinder, if the temperature allows.

6] Staged combustion. Staged combustion could be implemented by applying different air-fuel ratios to triple compound cylinders. It helps to increase fuel combustion efficiency, and to decrease engine emissions.

7] Water jacket around the first cylinder and the second cylinder could build with fluid superheaters, pre-heating the fluid to be injected into the cylinders while cooling the cylinders.

8] Thermal insulated engine block and insulated piston crown and piston cavity, reducing thermal energy loss from engine block.

9] Thermal energy recovery, using heat exchangers to absorb thermal energy released by the air compression from braking power regeneration, and to store the heated thermal energy carrying fluid into a vacuum insulated thermo tank for later use.

10] Exhaust heat energy recovery. In case compressed air is used as the fluid for injection, the compressed air could be pre-heated by exhaust heat through an exhaust heat exchanger, or exhaust pipe could be utilized as heat exchanger, so as to absorb waste heat and feed waste heat back to the engine.

11] Microcomputer controlled camless electromagnetic actuated cylinder valves. Such kind of cylinder valves would support unlimited variable valve timing, so that HEIHE-2 disclosed in the present invention could be programmed to implement either a Miller Cycle or Atkinson cycle, or even both of them, or other efficiency improving cycles. They would also configure HEIHE-2 into AC mode or CAE mode for braking power regeneration.

Therefore, it would be desirable that a High Efficiency Integrated Heat Engine-2, or HEIHE-2 bring much benefit, efficiency, cost-effectiveness and environment friendship to the future vehicles and power plants. There is no doubt that the present invention could revolutionize the ICE we used to.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous features and advantages of the present invention may be better understood by those skilled in the art by reference to the accompanying figures in which:

FIG. 26A and FIG. 26B are a structure diagram of inter-cylinder heat conveying fluid jacket of HEIHE-2 in accordance with the present invention, and its fluid circulation diagram;

FIG. 27 is a table of fuel conversion efficiency summary of HEIHE-2 in accordance with the present invention.

DETAILED DESCRIPTION OF THE INVENTION

Reference will now be made in detail to the presently preferred embodiments of the invention, examples of which are illustrated in the accompanying drawings.

The present invention is directed to the second kind of High Efficiency Integrated Heat Engine, or HEIHE-2 for short. HEIHE-2 is a heat engine integrated with compound cycle and combined cycle. Triple compound cylinder is utilized as a basic structure of HEIHE-2, with the first cylinder and the second cylinder being the primary combustion and/or expansion cylinders; and the third cylinder being the secondary combustion and/or expansion cylinder. Power strokes driven by expansions of different working fluids such as air-fuel combustion products, steam and compressed air, are integrated into one engine block. Many other efficiency improving measures are also integrated in HEIHE-2, such as Exhaust Actuated Valve (EAV), Variable Compression Ratio (VCR), inter-cylinder heat conveying fluid jacket and in-cylinder catalytic meshes. As a result, the operation of HEIHE-2 comprises four (4) different of power strokes, but only consumes fuel during two (2) baseline primary air-fuel power strokes.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Figure 1:
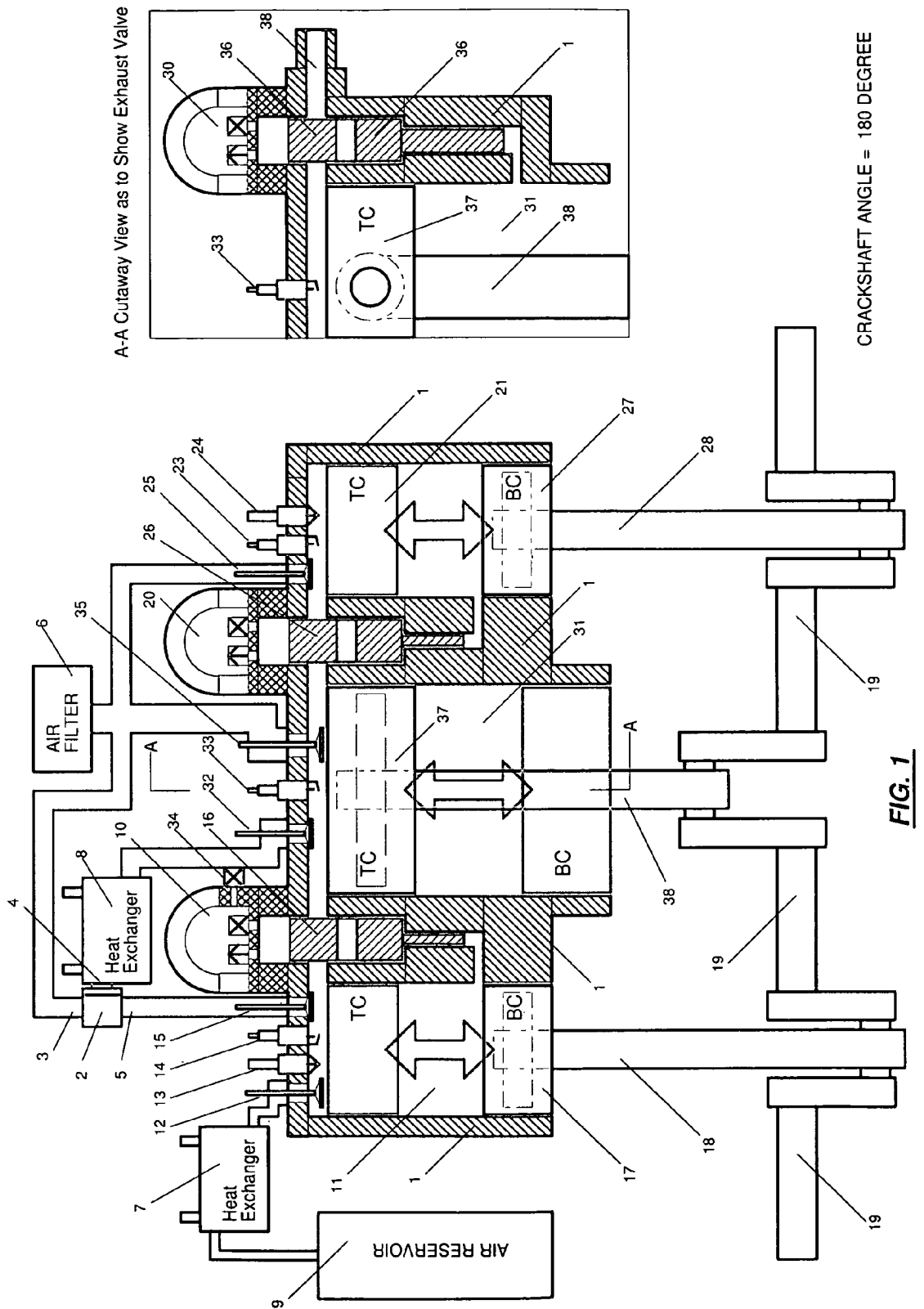
FIG. 1 is a basic structure diagram of HEIHE-2 in accordance with the present invention.

Referring to FIG. 1, a basic structure diagram of HEIHE-2 in accordance with the present invention is shown. HEIHE-2 basically has a reciprocating engine structure, where the pistons move back and forth in cylinders and transmit power through connecting rods and crank mechanism to power output shaft. HEIHE-2 may comprise at least one bank of triple compound cylinders within the same engine block 1, with the first cylinder 11 and the second cylinder 21 being the primary combustion and/or expansion cylinders; and the third cylinder 31 being the secondary combustion and/or expansion cylinder. A first piston 17 couples with the first cylinder 11, and a second piston 27 couples with the second cylinder 21, while a third piston 37 couples with the third cylinder 31. Two pistons inside the first cylinder 11 and the third cylinder 31 are mechanically coupled with the crankshaft 19 with 180 degree of crankshaft angle (CA) difference. Two pistons inside the second cylinder 21 and the third cylinder 31 are also mechanically coupled with the crankshaft 19 with 180 degree of crankshaft angle (CA) difference. Thus when the first piston 17 and the second piston 27 are at the bottom-center (BC), the third piston 37 would be exactly at the top-center (TC), or vise versa. The third cylinder has larger volume than that of the first cylinder or the second cylinder, so as the compound extended expansion could happen when the working fluids are transferred from the first cylinder to the third cylinder, or from the second cylinder to the third cylinder. Larger cylinder volume results in either larger piston diameter (Bore) or larger displacement (Stroke), or both of them as shown in FIG. 1.

Still in FIG. 1, the first connecting rod 18 couples the first piston 17 with the crankshaft 19, and the second connecting rod 28 couples the second piston 27 with the crankshaft 19, while the third connecting rod 38 couples the third piston 37 with the crankshaft 19. On top of the first cylinder, there are storage valve 12, spark plug 13, fluid injector 14 and intake valve 15. A first piston valve 16 controls working fluid transfer from first cylinder 11 to the third cylinder 31, which is actuated vertically by exhaust gas pressure. Pressure chamber 10 keeps and provides actuation pressure to piston valve 16. Storage valve 12 controls the gas flow between the first cylinder 11 and air storage reservoir 9 through heat exchanger 7. Intake valve 15 controls the gas flow between intake switch valve 2 and the first cylinder 11. Intake switch valve 2 has 3 ports, with the first port 3 connects to air filter 6; the second port 4 connects to heat exchanger 8 and the third port 5 connects to intake valve 15 of the first cylinder 11. During the normal engine mode, intake switch valve 2 turns on the passage between port 3 and port 5 while cutting port 4 off. During the air hybrid braking power regeneration mode, intake switch valve 2 turns on the passage between port 4 and port 5 while cutting port 3 off.

On top of the second cylinder, there are intake valve 25, spark plug 23 and fluid injector 24. A second piston valve 26 controls working fluid transfer from second cylinder 21 to the third cylinder 31, which is actuated vertically by exhaust gas pressure. Pressure chamber 20 keeps and provides actuate pressure to piston valve 26. Intake valve 25 controls the gas flow between air filter 6 and the second cylinder 21.

On top of the third cylinder, there are pre-charge valve 32, spark plug 33 and intake valve 35. A piston valve 36 (in A-A cutaway view) controls working fluid discharge from the third cylinder 31 to exhaust port 38, which is actuated vertically by exhaust gas pressure from the third cylinder 31. Pressure chamber 30 keeps and provides actuate pressure to piston valve 36. Pre-charge valve 32 controls the gas flow between the third cylinder 31 and heat exchanger 8. Intake valve 35 controls the gas flow between the air filter 6 and the third cylinder 31. Switching valve 34 is utilized to regulate the pre-charging air flow that would be pumped into pressure chambers 10 for its proper working pressure.

Based on the compound working fluid expansion inside triple cylinders, 2 different working fluids would drive 2 different power strokes: air-fuel mixture combustion and combustion products expansions first, and then combined fluids expansion. The combined fluids are obtained by injecting fluid against the hot expanded air-fuel combustion products into the cylinders or their working fluid transfer channels at the time when air-fuel combustion and expansion strokes are just completed while the first piston or the second piston is still at BC, absorbing the heat from the full cylinder of hot combustion products as well as the remaining heat inside each of the fully expanded cylinders, resulting both steam generation, combined fluids expansion inside the third cylinder and fluid cooling effects inside the first cylinders or the second cylinder.

Different fluid expansions happen in triple cylinders would obtain two (2) different kinds of power strokes. These two (2) different kinds of power strokes are:

1] Primary power stroke—Primary air-fuel combustion and combustion products expansion in either the first cylinder or the second cylinder. This is the baseline power stroke, being the same as the one happened in conventional ICE; and 2] Secondary power stroke—Secondary air-fuel combustion and combustion products expansion in the third cylinder; plus steam generation and/or working fluid injection into either the first cylinder or the second cylinder, being combined with and heated by air-fuel combustion products; and combined working fluids expansion in the third cylinder.

The above two (2) different kinds of power strokes could be judiciously scheduled into four (4) periods in order to obtain both the maximum mechanical efficiency and thermodynamic efficiency. During each period, three different strokes would happen in triple cylinders simultaneously, resulting totally twelve (12) strokes in a full HEIHE-2 working cycle of 2 complete revolutions, or 720 degree of crankshaft angle (CA). Among these twelve (12) strokes in a full HEIHE-2 working cycle, there are six (6) kinds of independent strokes: Intake, Compression, Primary power, Transfer, Secondary power and Exhaust. Therefore, HEIHE-2 disclosed in the present invention is a six-stroke heat engine, with the first cylinder and the second cylinder working at four-stroke mode; and the third cylinder working at two-stroke mode. Such kind of engine could also be referred as "(4+2)-stroke" engine. The engine cycle in accordance with the present invention could be referred as "HEIHE Cycle".

Figure 2:
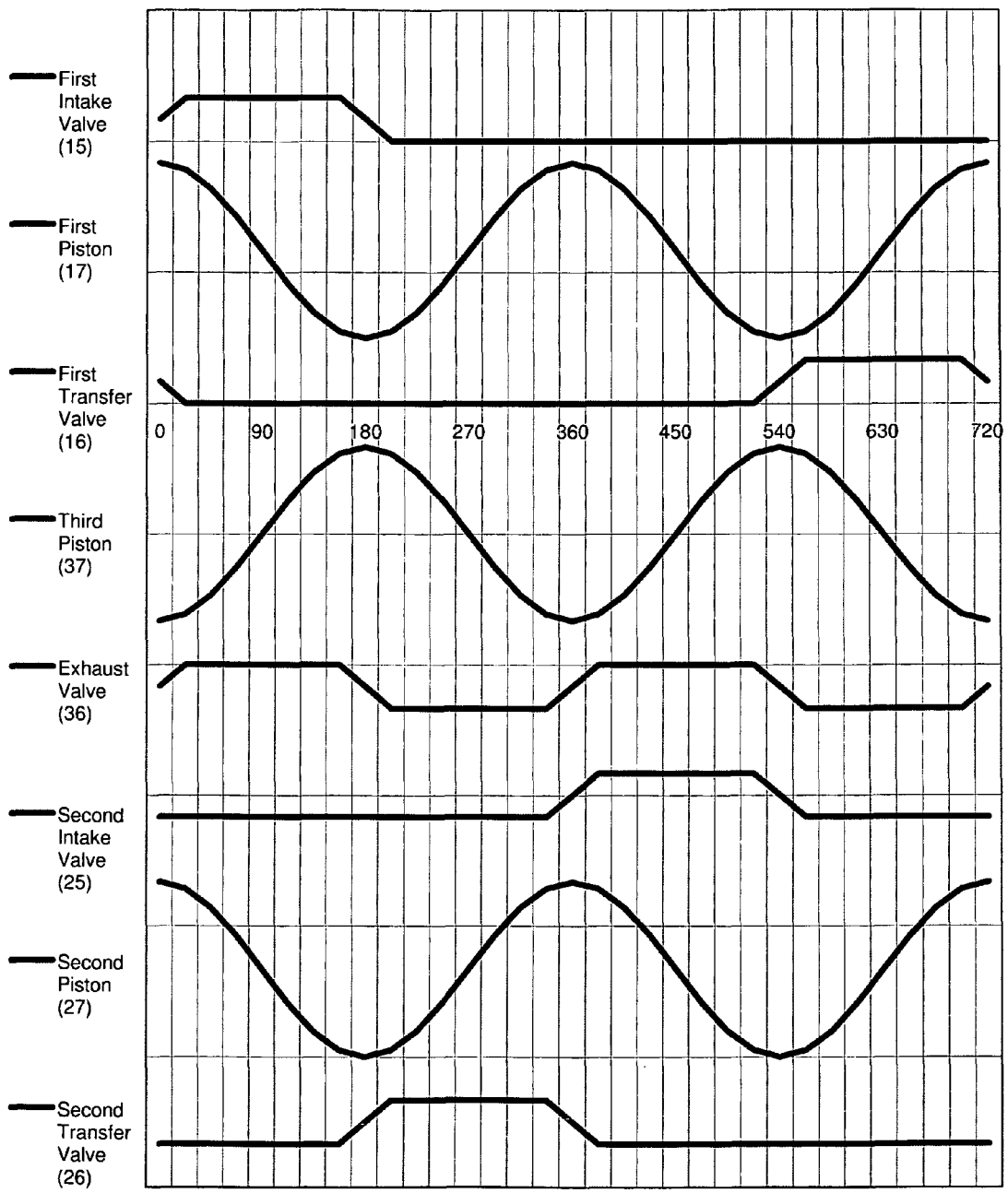
FIG. 2 is a sequence of events diagram of HEIHE-2 in accordance with the present invention.

FIG. 2 is a sequence of events diagram of HEIHE-2 in accordance with the present invention, where piston displacements and valve movements are shown along with the crankshaft angle turning around the total four (4) periods in a full HEIHE-2 working cycle of 2 complete revolutions, or 720 degree CA. Among these four (4) working periods, each period covers 180 degree CA, and three (3) different strokes happen in triple cylinders during each period. The related six (6) kinds of strokes scheduled in four (4) periods could be listed as follows:

(1) The first period, from 0 degree to 180 degree CA, intake stroke in the first cylinder, with the first piston moves down from TC to BC; and exhaust stroke in the third cylinder, with the third piston moves up from BC to TC; also air-fuel power stroke in the second cylinder, with the second piston moves down from TC to BC. A spark ignition happens in the second cylinder at 0 degree CA. Both the first intake valve 15 and exhaust valve 36 open during this period.

(2) The second period, from 180 degree to 360 degree CA, compression stroke in the first cylinder, with the first piston moves up from BC to TC; and combined fluids power stroke in the third cylinder, with the third piston moves down from TC to BC; also transfer stroke in the second cylinder, with the second piston moves up from BC to TC. A fluid injection happens in the second cylinder at 180 degree CA while the second piston is at BC. The second inter-cylinder transfer valve 26 opens during this period.

(3) The third period, from 360 degree to 540 degree CA, primary air-fuel power stroke in the first cylinder, with the first piston moves down from TC to BC; and exhaust stroke in the third cylinder, with the third piston moves up from BC to TC; also intake stroke in the second cylinder, with the second piston moves down from TC to BC. A spark ignition happens in the first cylinder at 360 degree CA. Both the second intake valve 25 and exhaust valve 36 open during this period.

(4) The fourth period, from 540 degree to 720 degree CA, transfer stroke in the first cylinder, with the first piston moves up from BC to TC; and combined fluids power stroke in the third cylinder, with the third piston moves down from TC to BC; also compression stroke in the second cylinder, with the second moves up from BC to TC. A fluid injection happens in the first cylinder at 540 degree CA while the first piston is at BC. The first inter-cylinder transfer valve 16 opens during this period.

The following 3 text lines summarize the strokes happened during the above 4 periods inside the triple cylinders respectively:
The first cylinder: Intake—Compression—Primary power—Transfer
The third cylinder: Exhaust—Secondary power—Exhaust—Secondary power
The second cylinder: Primary power—Transfer—Intake—Compression As we could see from above, the third cylinder is dedicated for secondary combined fluids power strokes, and it could generate power once every other period, or once every crankshaft revolution. Meanwhile, both the first cylinder and the second cylinder work much the same way as conventional four-stroke ICE, but their exhausts would not be discharged out of HEIHE-2, instead, being transferred to the third cylinder for further expansion. During normal engine mode, air flow switching valve 2 is set at air filter side, feeding intake valve 15 with fresh air from air filter 6.

Figure 3:
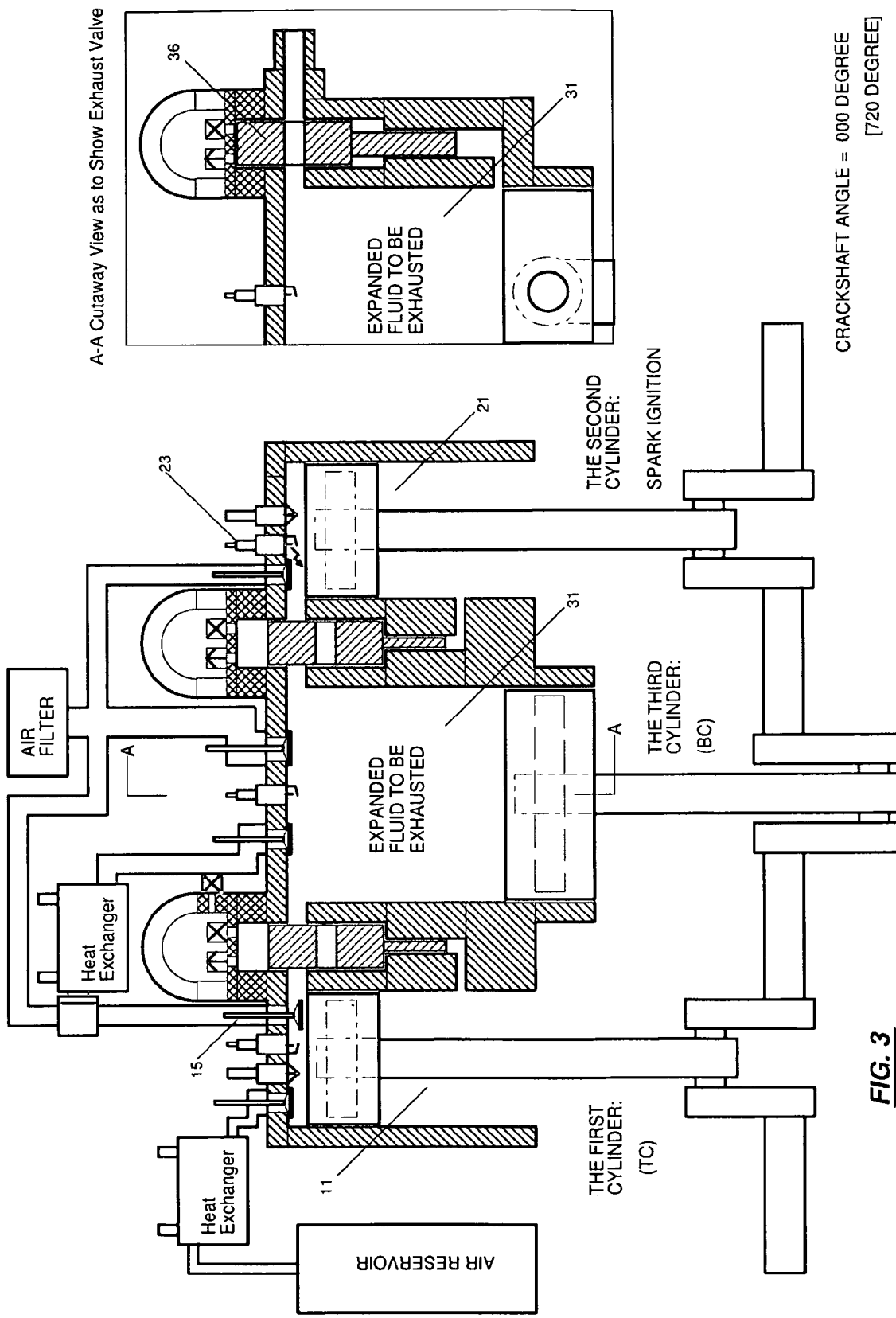
FIG. 3 is an operation diagram of HEIHE-2 in accordance with the present invention, with its crankshaft angle at starting point of zero degree.

Now referring to FIG. 3, an operation diagram of HEIHE-2 in accordance with the present invention is shown, with the crankshaft angle of HEIHE-2 is at starting point of zero degree CA. This point is also the first spark ignition point. The first piston is at TC while the third piston is at BC; the second piston is also at TC. Intake valve 15 is open, getting ready for air-fuel mixture to be charged into the first cylinder 11. Exhaust valve 36 (in A-A cutaway view) is also open, getting ready for expanded combined fluids happened during the previous working cycle to be discharged from the third cylinder 31. Other valves would remain closed. Spark plug 23 on top of the second cylinder 21 is setting an ignition spark onto the compressed air-fuel mixture, starting an air-fuel mixture combustion and combustion products expansion process inside the second cylinder.

Figure 4:
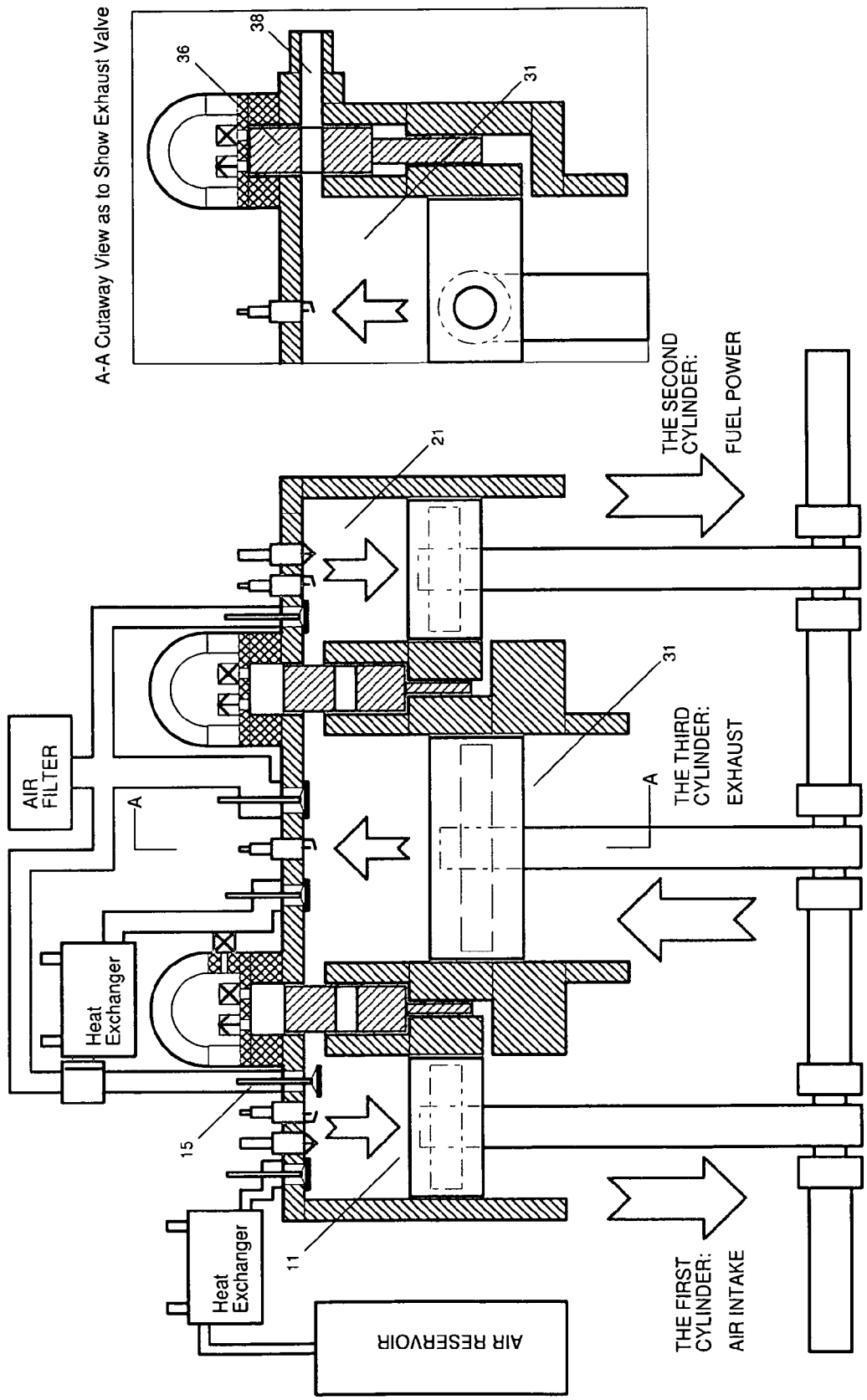
FIG. 4 is an operation diagram of HEIHE-2 in accordance with the present invention, with its crankshaft angle at 90 degree after starting point.

Referring to FIG. 4, an operation diagram of HEIHE-2 in accordance with the present invention is shown, with the crankshaft angle of HEIHE-2 is at the first period of 90 degree CA. The first piston is moving downward while the third piston is moving upward; the second piston is also moving downward. Intake valve 15 is open, so the pre-mixed air-fuel mixture is charging into the first cylinder 11. Exhaust valve 36 (in A-A cutaway view) is also open, so the expanded combined fluids happened during the previous working cycle is discharging from the third cylinder 31 to the outside of the HEIHE-2 through exhaust port 38. Other valves would remain closed. At this moment, the air-fuel mixture is being combusted and expanded inside the second cylinder 21. Thus the second cylinder is contributing a positive work while the second piston is moving downward. This is one of the baseline power strokes of HEIHE-2 in accordance with the present invention called primary air-fuel combustion and combustion products expansion stroke, or primary power stroke for short. During this period, intake stroke, exhaust stroke and primary power stroke happen in the first cylinder, the third cylinder and the second cylinder respectively.

Figure 5:
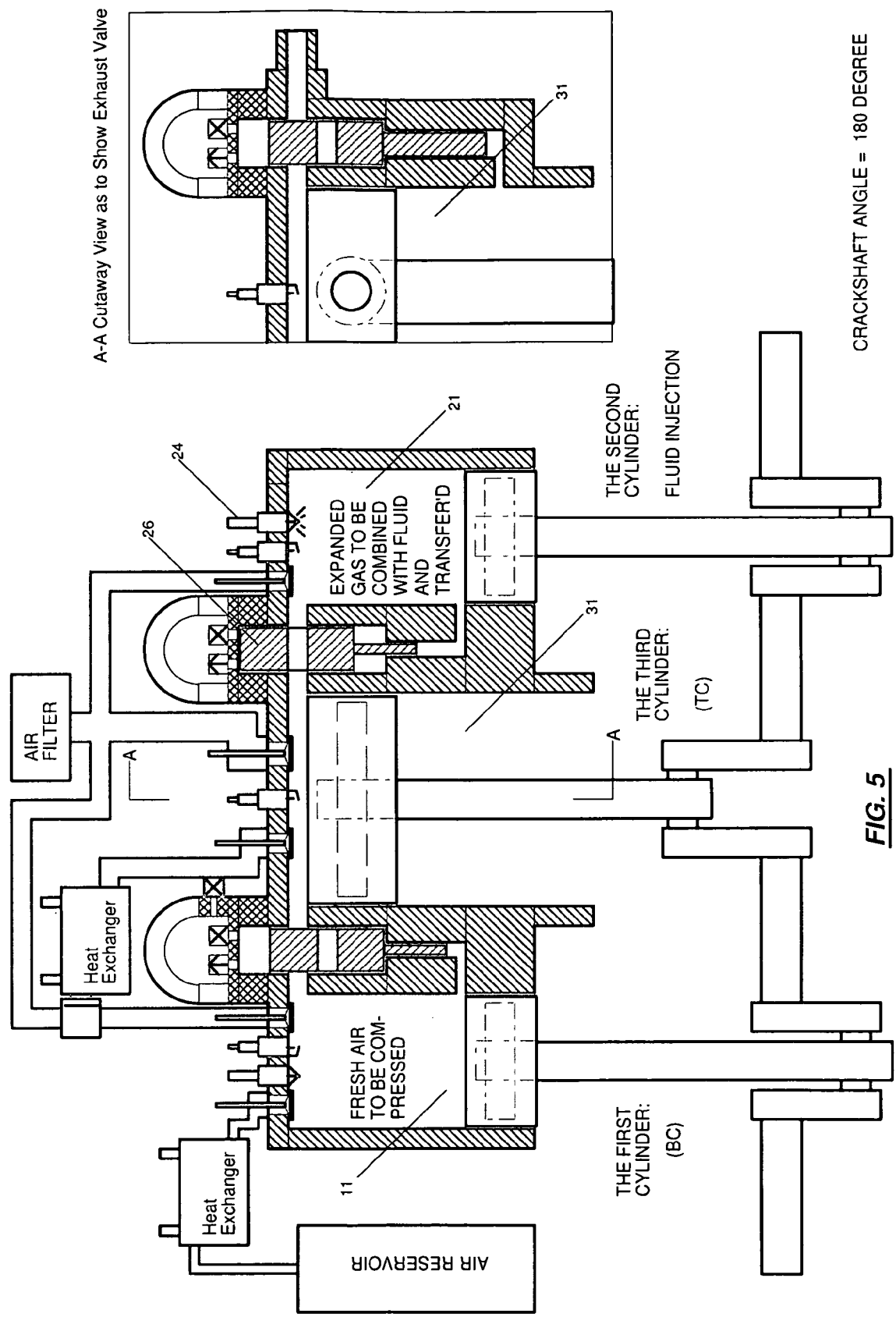
FIG. 5 is an operation diagram of HEIHE-2 in accordance with the present invention, with its crankshaft angle at 180 degree after starting point.

Referring now to FIG. 5, an operation diagram of HEIHE-2 in accordance with the present invention is shown, with the crankshaft angle of HEIHE-2 is at the first fluid injection point of 180 degree CA. The first piston is at BC while the third piston is at TC; the second piston is also at BC. All the valves are closed except transfer valve 26. The first cylinder 11 is at the end of intake stroke; the third cylinder 31 is at the end of exhaust stroke while the second cylinder 21 is at the end of air-fuel power stroke. At this moment, fluid injector 24 on top of the second cylinder is injecting fluid into combustion chamber of the second cylinder against the hot expanded air-fuel combustion products. Inter-cylinder transfer valve 26 is open, getting ready for the expanding combined working fluids generated from fluid injection to be transferred from the first cylinder into the third cylinder.

Liquid water could be utilized as the fluid to be injected into the second cylinder 21. In this case purified water or distilled water would be preferred, which would leave no chemical residuals inside the cylinders. Other kind of fluid could also be used, such as compressed steam, compressed air, liquid air, liquid nitrogen or water solution of ethanol, where ethanol could serve as an anti-freezer. A mixture of purified water and compressed air could also be used as the fluid for injection.

In another embodiment, compressed air could be utilized as a dedicated fluid for injection. The unique benefits of such a gaseous fluid would be no need to change the phase before making expansion; the specific heat being very close to that of combustion products; no deposits and residuals to engine parts and non-corrosive to engine metal parts. Compressed air not only contains energy or being self-pressured, but also possesses a valuable thermodynamic feature that it trend to absorb, thus to pick up or recover, heat energy from low grade heat sources such as the remaining heat inside the cylinder, the heat from exhaust as well as surroundings.

Figure 6:
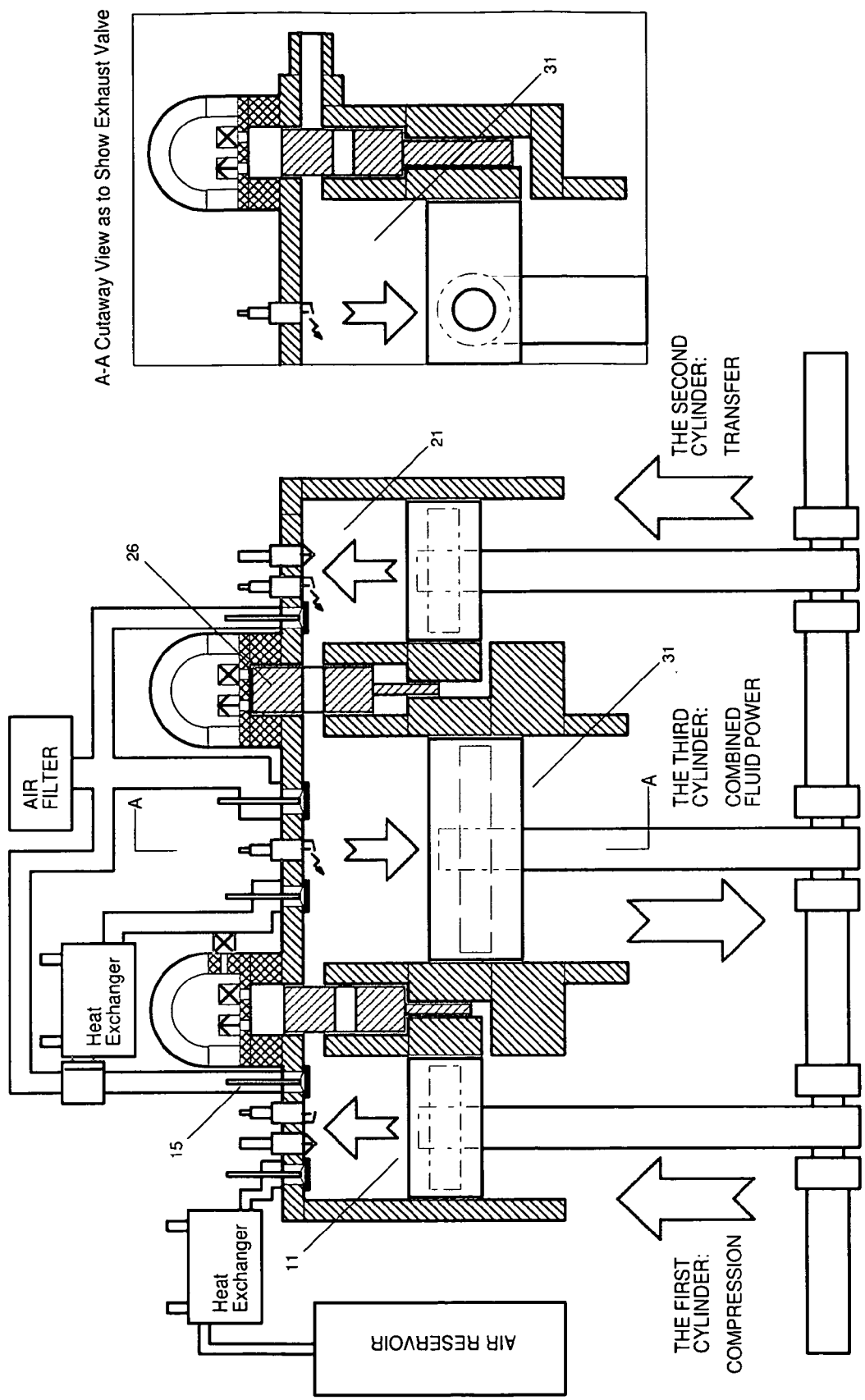
FIG. 6 is an operation diagram of HEIHE-2 in accordance with the present invention, with its crankshaft angle at 270 degree after starting point.

Now referring to FIG. 6, an operation diagram of HEIHE-2 in accordance with the present invention is shown, with the crankshaft angle of HEIHE-2 is at the second period of 270 degree CA. The first piston is moving upward while the third piston is moving downward; the second piston is also moving upward. Intake valve 15 is closed, so the air-fuel mixture is being compressed inside the first cylinder 11. Inter-cylinder transfer valve 26 is open, so the combined working fluids generated from fluid injection are being transferred from the second cylinder 21 into the third cylinder 31. Other valves would remain closed. Since the third cylinder has larger volume than that of the second cylinder, the combined working fluids transferred from the second cylinder still has room to do further expansion. Thus the third cylinder is contributing a positive work while the third piston is moving downward. This is an important power stroke of HEIHE-2 in accordance with the present invention called secondary combined working fluids expansion stroke, or secondary power stroke for short. During this period, compression stroke, secondary power stroke and transfer stroke happen in the first cylinder, the third cylinder and the second cylinder respectively. Meanwhile during this period, one or more ignition sparks could also be applied into both the second cylinder and the third cylinder against the expanding combined working fluids that might contain combustible gases like hydrogen, oxygen, carbon monoxide, methane and unburned hydrocarbons, making the expansion more powerful inside the third cylinder.

Figure 7:
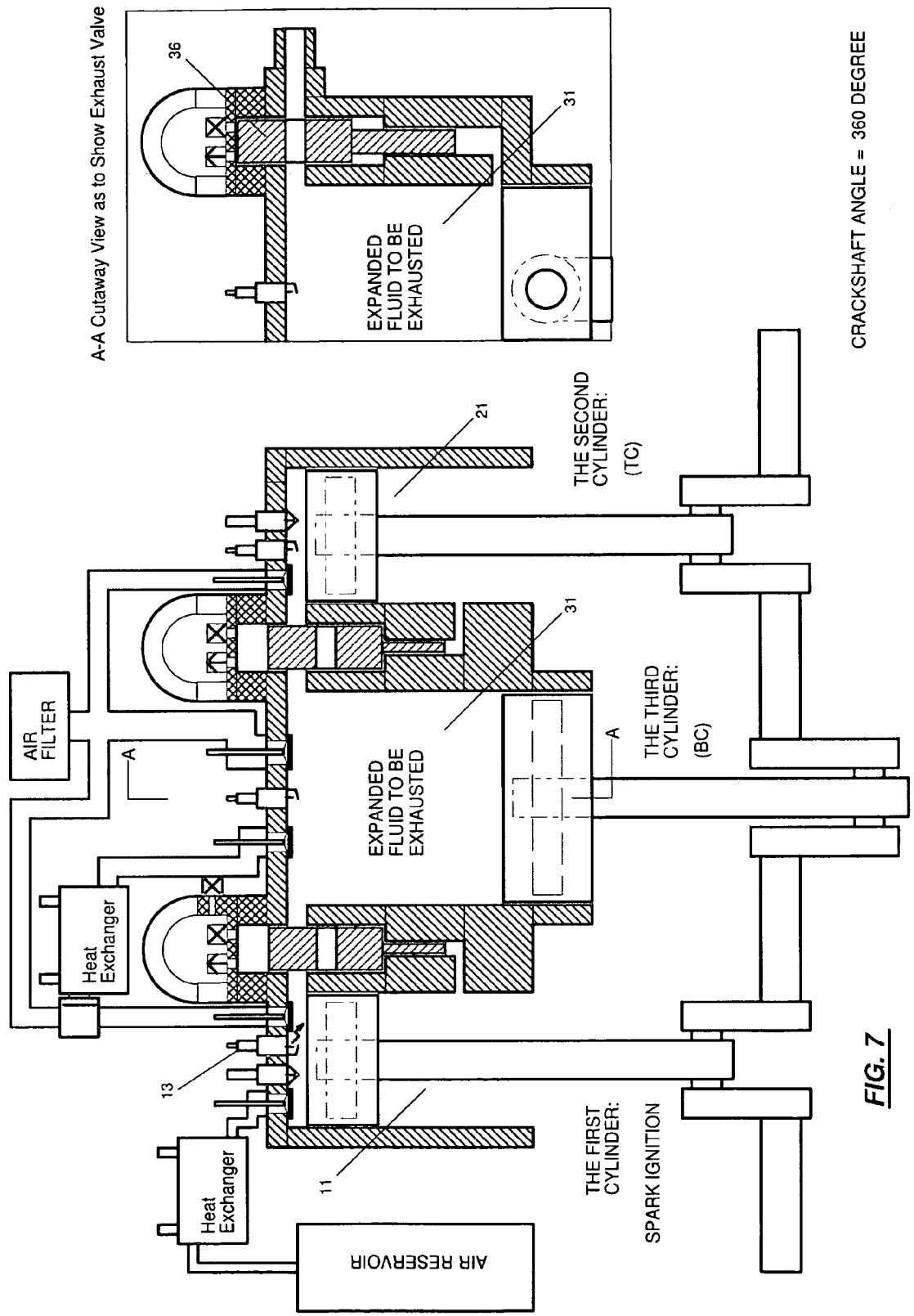
FIG. 7 is an operation diagram of HEIHE-2 in accordance with the present invention, with its crankshaft angle at 360 degree after starting point.

Referring now to FIG. 7, an operation diagram of HEIHE-2 in accordance with the present invention is shown, with the crankshaft angle of HEIHE-2 is at the second spark ignition point of 360 degree CA. The first piston is at TC while the third piston is at BC; the second piston is also at TC. Exhaust valve 36 (in A-A cutaway view) is open, getting ready for expanded combined working fluids happened during the previous working period to be discharged from the third cylinder 31. Other valves would remain closed. Spark plug 13 on top of the first cylinder 11 is setting an ignition spark onto the compressed air-fuel mixture, starting an air-fuel mixture combustion and combustion products expansion process inside the first cylinder.

Figure 8:
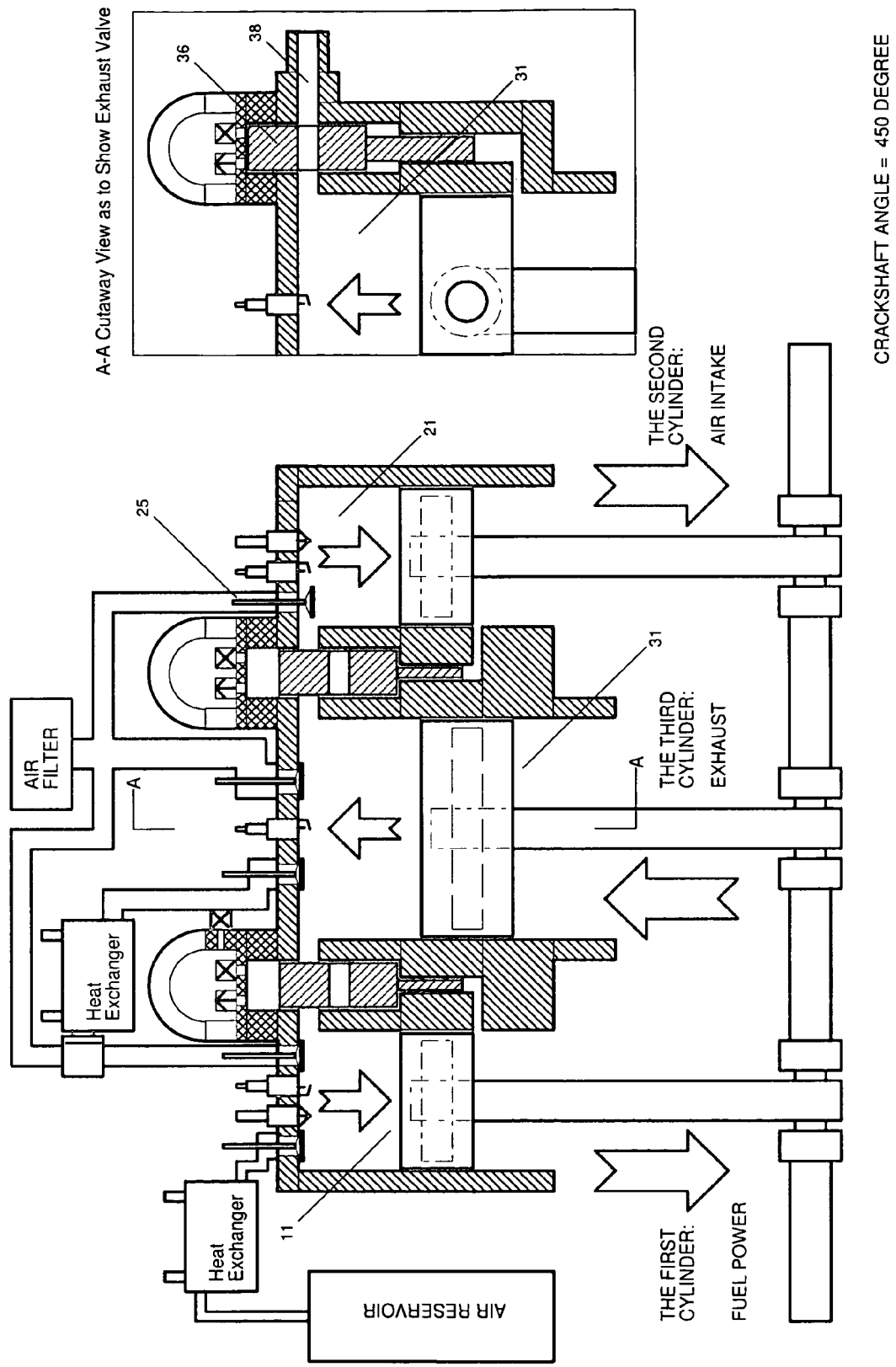
FIG. 8 is an operation diagram of HEIHE-2 in accordance with the present invention, with its crankshaft angle at 450 degree after starting point.

Referring now to FIG. 8, an operation diagram of HEIHE-2 in accordance with the present invention is shown, with the crankshaft angle of HEIHE-2 is at the third period of 450 degree CA. The first piston is moving downward while the third piston is moving upward; the second piston is also moving downward. On top of the second cylinder 21, intake valve 25 is open, so the pre-mixed air-fuel mixture is charging into the second cylinder. Exhaust valve 36 (in A-A cutaway view) is also open, so the expanded combined working fluids happened in the previous working period is discharging from the third cylinder 31 to the outside of the HEIHE-2 through exhaust port 38. Other valves would remain closed. At this moment, the air-fuel mixture is being combusted and expanded inside the first cylinder 11. Thus the first cylinder is contributing a positive work while the first piston is moving downward. This is one of the baseline power strokes of HEIHE-2 in accordance with the present invention called primary air-fuel combustion and combustion products expansion stroke, or primary power stroke for short. During this period, primary power stroke, exhaust stroke and intake stroke happen in the first cylinder, the third cylinder and the second cylinder respectively.

Figure 9:
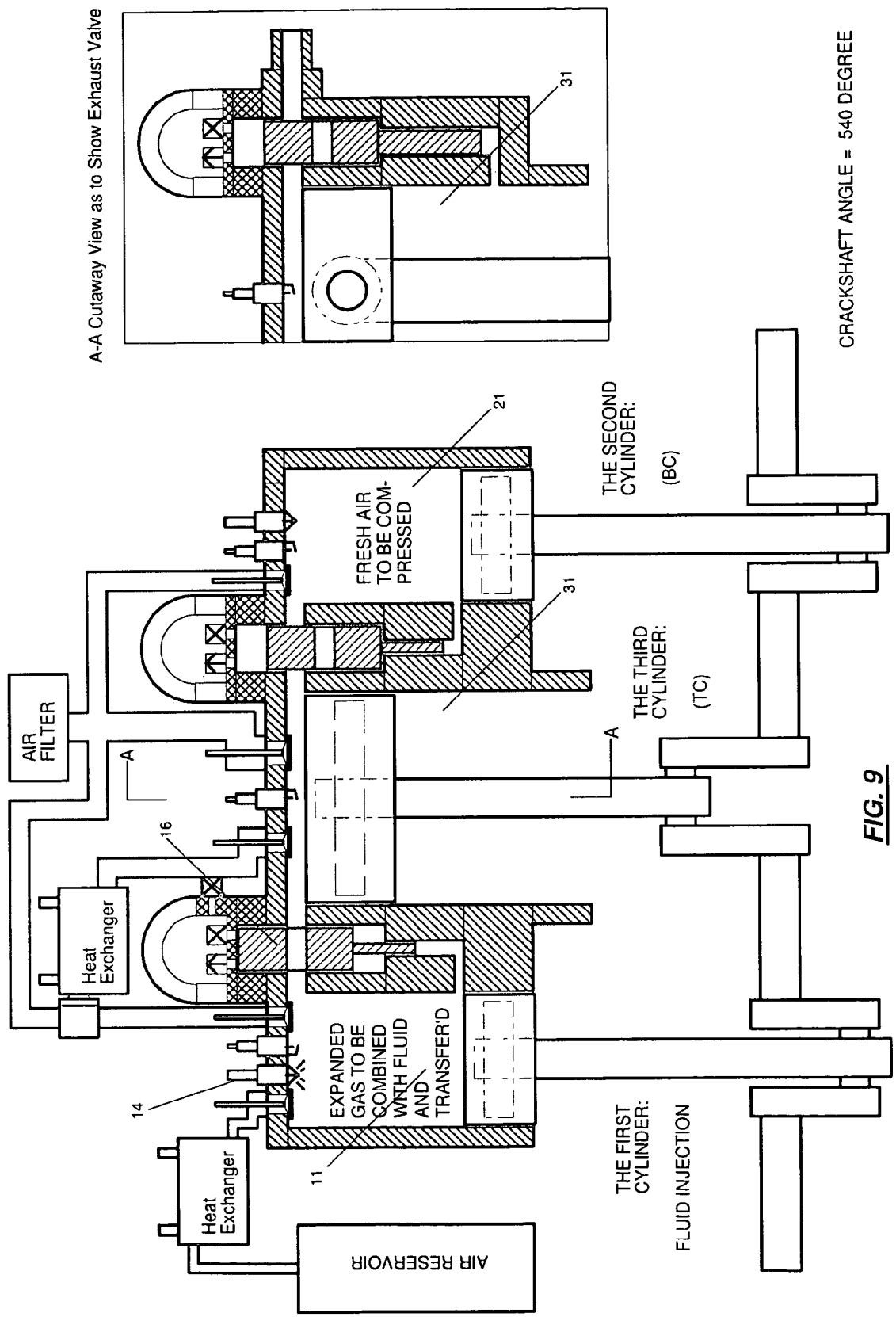
FIG. 9 is an operation diagram of HEIHE-2 in accordance with the present invention, with its crankshaft angle at 540 degree after starting point.

Now referring to FIG. 9, an operation diagram of HEIHE-2 in accordance with the present invention is shown, with the crankshaft angle of HEIHE-2 is at the second fluid injection point of 540 degree CA. The first piston is at BC while the third piston is at TC; the second piston is also at BC. All the valves are closed except transfer valve 16. The first cylinder 11 is at the end of primary power stroke; the third cylinder 31 is at the end of exhaust stroke while the second cylinder 21 is at the end of intake stroke. At this moment, fluid injector 14 on top of the first cylinder is injecting fluid into combustion chamber of the first cylinder against the hot expanded air-fuel combustion products. Inter-cylinder transfer valve 16 is open, getting ready for the expanding combined working fluids generated from fluid injection to be transferred from the first cylinder into the third cylinder.

Liquid water could be utilized as the fluid to be injected into the first cylinder 11. In this case purified water or distilled water would be preferred, which would leave no chemical residuals inside the cylinders. Other kind of fluid could also be used, such as compressed steam, compressed air, liquid air, liquid nitrogen or water solution of ethanol, where ethanol could serve as an anti-freezer. A mixture of purified water and compressed air could also be used as the fluid for injection.

Figure 10:
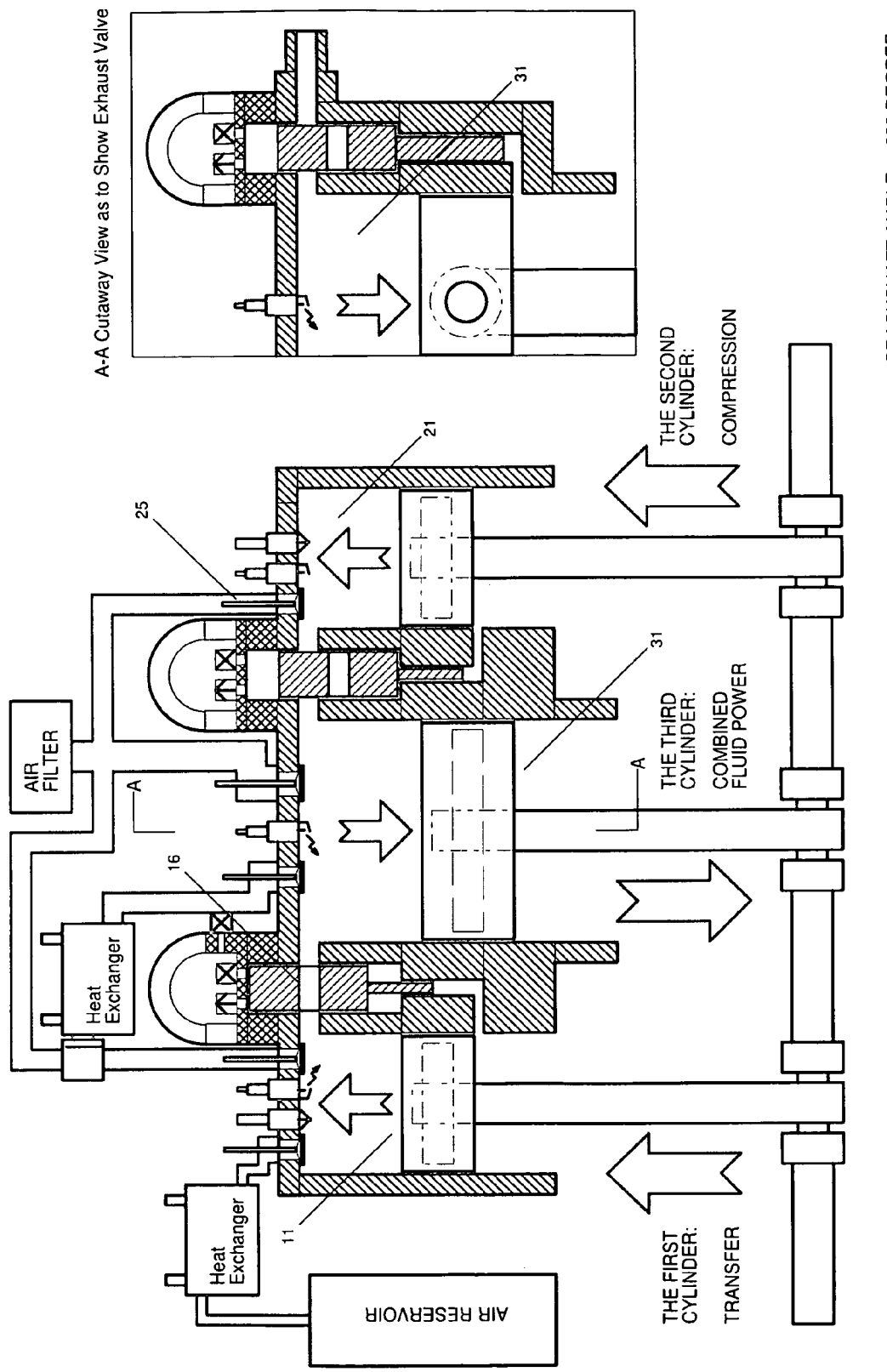
FIG. 10 is an operation diagram of HEIHE-2 in accordance with the present invention, with its crankshaft angle at 630 degree after starting point.

Referring now to FIG. 10, an operation diagram of HEIHE-2 in accordance with the present invention is shown, with the crankshaft angle of HEIHE-2 is at the fourth period of 630 degree CA. The first piston is moving upward while the third piston is moving downward; the second piston is also moving upward. All the valves are closed except transfer valve 16. Inter-cylinder transfer valve 16 is open, so the combined working fluids generated from fluid injection are being transferred from the first cylinder 11 into the third cylinder 31. Other valves would remain closed. Since the third cylinder has larger volume than that of the first cylinder, the combined working fluids discharged from the first cylinder still has room to do further expansion. Thus the third cylinder is contributing a positive work while the third piston is moving downward. This is another important power stroke of HEIHE-2 in accordance with the present invention called secondary combined working fluids expansion stroke, or secondary power stroke for short. Intake valve 25 for the second cylinder 21 is also closed, so the air-fuel mixture is being compressed inside the second cylinder while the second piston is moving upward. During this period, transfer stroke, secondary power stroke and compression stroke happen in the first cylinder, the third cylinder and the second cylinder respectively. Meanwhile during this period, one or more ignition sparks could also be applied into both the first cylinder and the third cylinder against the expanding combined working fluids that might contain combustible gases like hydrogen, oxygen, carbon monoxide, methane and unburned hydrocarbons, making the expansion more powerful inside the third cylinder.

It must be emphasized that the combustible gases during two of the above periods, both the second period and the fourth period, would come from physical and/or chemical processes such as thermal cracking of steam, and steam cracking and/or hydrocracking of unburned hydrocarbons. For example, under high combustion chamber temperature steam would be thermally cracked into hydrogen and oxygen. Unburned hydrocarbons would be steam cracked chemically into hydrogen, oxygen, carbon monoxide, methane and other smaller-molecule hydrocarbons. Further, unburned hydrocarbons would be hydrocracked chemically into lighter, more combustible hydrocarbons. All of these cracking products are combustible and contain latent thermal energy. Therefore, combustion must be made as to convert this latent thermal energy into heat energy. Once the heat energy is released inside the cylinder during the secondary power stroke, it makes extra power.

In FIG. 1, switching valve 34 is a device that could be utilized to regulate the pre-charging air flow that would be pumped into pressure chamber 10 for its proper working pressure. Whenever switching valve 34 is open electromagnetically, it would branch a determined portion of pre-charging stream into pressure chamber 10. As a result, a proper working pressure could be maintained inside pressure chamber 10. Other pressure chambers 20 and 30 could also be charged in similar way. In the other hand, reducing the amount of pre-charging stream would change the volumetric capacity of the charge flowing into the first cylinder. Thus totally resulted compound compression ratio of triple compound cylinders would be altered, obtaining the effect of controlled variable compression ratio.

Variable compression ratio could be one of the features of HEIHE-2 disclosed in the present invention. It would makes changing compression ratio possible during the operation according to the varying load. To achieve higher power outputs without increasing speed, more fuel must be burnt and therefore more air would be required. As primary cylinders of HEIHE-2 have longer mechanical strokes, it would result increased charging pressure, obtaining higher compression ratio. Higher compression ratio would result in higher fuel conversion efficiency. But higher compression ratio might cause undesired detonation of the air-fuel mixture unless the compression ratio could be decreased or be controlled in real time. Thus a variable compression ratio would be expected for HEIHE-2. This could be done to greater or lesser extent with massive increases in power whenever possible, resulting a smaller sized efficient engine that behaves exactly like a larger sized engine but turns into a highly tuned one on demand. Variable compression ratio is becoming increasingly desirable as it would increase fuel conversion efficiency and provide better fuel economy.

In HEIHE-2 disclosed in the present invention, just by changing the timing of intake valves 15 and 25, variable compression ratio would be implemented and controlled dynamically. During compression stroke, an earlier close of intake valve would result in higher compression ratio, while a later close of intake valve would result in lower compression ratio. To obtain variable intake valve timing, micro-computer controlled electromagnetically actuated valves could be the best choice.

Further, variable compression ratio would make HEIHE-2 multiple fuels compatible. Many alternative fuels, such as methanol, ethanol, propane, LPG, nature gas and hydrogen, have higher octane rating than that of gasoline. So higher compression ratio would be expected for higher fuel conversion efficiency if fuel octane rating allows. In case gasoline would be used as HEIHE-2 fuel but someone may intend to burn gasoline fuel under the Compression Ignition by Direct Injection (CIDI) mode in order to obtain higher fuel conversion efficiency, variable compression ratio would be absolutely required. In this case, spark plug 13 on top of the first cylinder and spark plug 23 on top of the second cylinder could be replaced by fuel injectors, so as to inject gasoline fuel into the first cylinder and the second cylinder directly. Apparently, CIDI mode would also make HEIHE-2 diesel or biodiesel fuels compatible.

In FIG. 1, piston valves 16, 26 and 36 could also be named as Exhaust Actuated Valve (EAV). As the name implies, they are actuated by exhaust pressure. FIGS. 11 through 16 show operation processes of EAV by taking EAV 16 as an example. EAV 26 and 36 work in much the same way as EAV 16, and three of them have identical mechanical structure. The only difference is the diameter of EAV 36, which needs larger diameter due to the lower exhaust pressure from the third cylinder 31.

Figure 11:
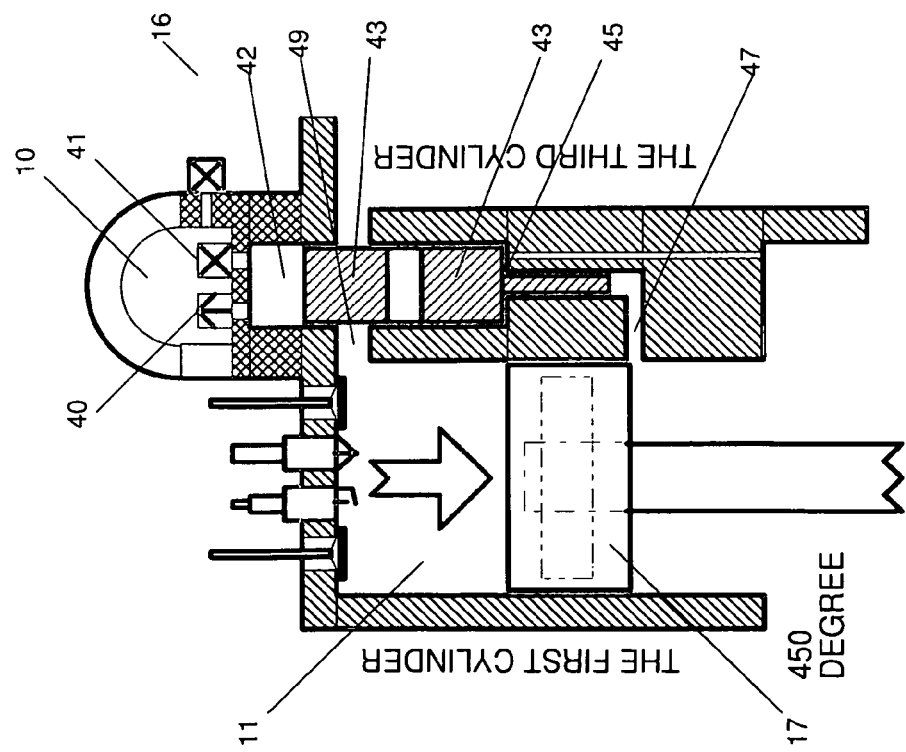
FIG. 11 is an operation diagram of exhaust actuated valve (EAV) of HEIHE-2 in accordance with the present invention, with its crankshaft angle at 450 degree for the first cylinder after starting point.

Referring now to FIG. 11, an operation diagram of EAV inside HEIHE-2 in accordance with the present invention is shown, with the crankshaft angle of HEIHE-2 is at the middle of power stroke of 450 degree CA. The first piston 17 is moving downward. EAV 16 remains closed during the power stroke. The EAV pressure chamber 10 keeps a positive pressure Peav. Electromagnetic switching valve 41 once opened before the power stroke as to charge the upper EAV cylinder 42 with the positive pressure Peav. On bottom side of EAV piston 43, there's an exhaust duct 47 from bottom area of the cylinder 11. During the most of the downward travel of power stroke, the exhaust duct 47 is open to the crankshaft case, with a pressure almost equals to atmosphere pressure. As the upper cylinder pressure Peav is higher than the atmosphere pressure, the EAV piston 43 is held down to the bottom side of lower EAV cylinder 45 due to the pressure difference. As a result, the EAV 16 is closed. The exhaust discharging channel 49 is cut off by EAV piston 43. In most of the time, both check valve 40 and switching valve 41 are shut off.

Figure 12:
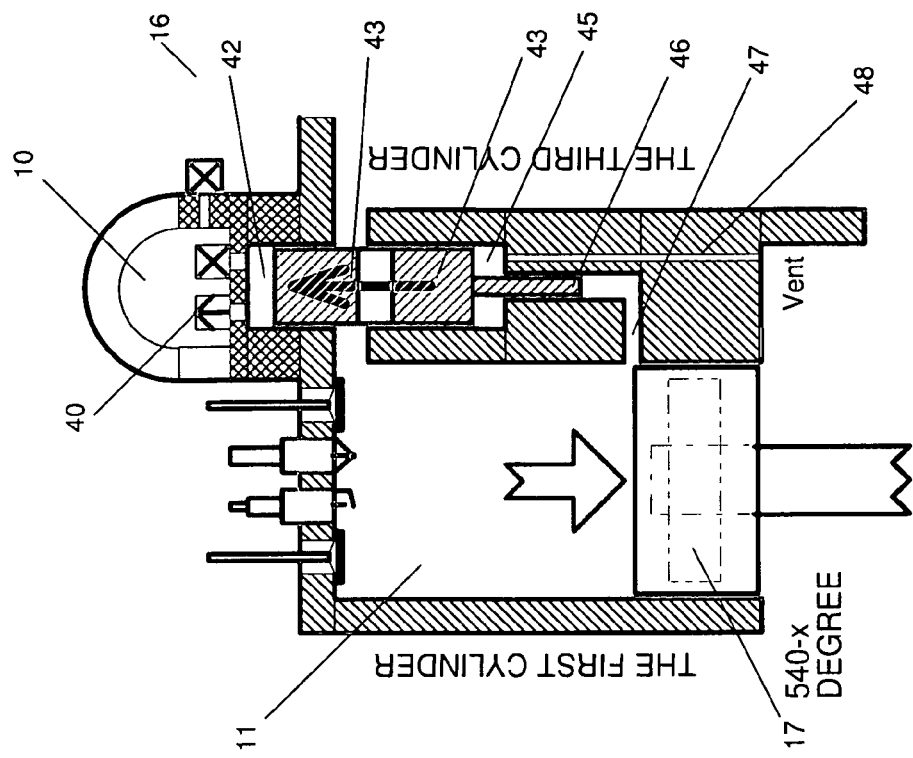
FIG. 12 is an operation diagram of exhaust actuated valve (EAV) of HEIHE-2 in accordance with the present invention, with its crankshaft angle at 540 minus x degree for the first cylinder after starting point.

Referring now to FIG. 12, an operation diagram of EAV inside HEIHE-2 in accordance with the present invention is shown, with the crankshaft angle of HEIHE-2 is approaching the end of power stroke of 540 minus x degree CA, that is, x degree before BC. The first piston 17 is moving downward beyond the opening of exhaust duct 47 in cylinder 11. At this moment, the expanding exhaust gas has higher pressure than upper EAV cylinder pressure Peav. It would rush into the exhaust duct 47, pushing the pressure head 46 as well as EAV piston 43 upward. Thus EAV 16 begins to open. As a result of EAV piston 43 moving upward, the pressure of upper EAV cylinder 42 becomes higher than Peav. So the check valve 40 is forced to open, pumping the gas from upper EAV cylinder 42 into EAV pressure chamber 10. The vent 48 feeds the crankshaft air into the lower EAV cylinder 45.

Figure 13:
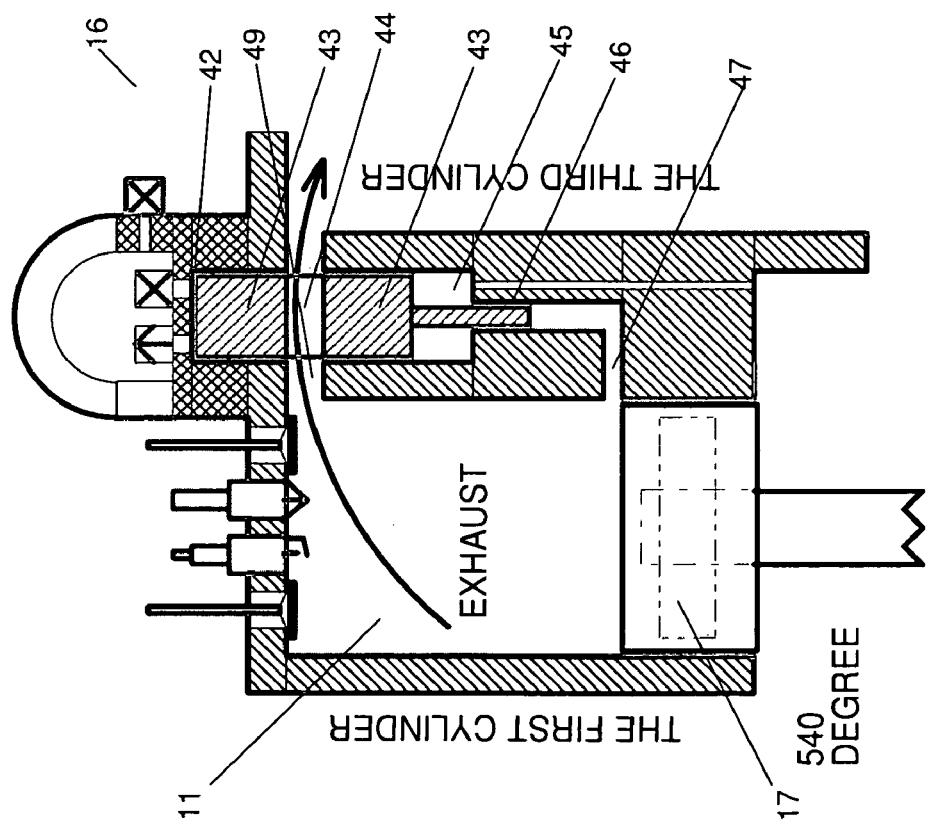
FIG. 13 is an operation diagram of exhaust actuated valve (EAV) of HEIHE-2 in accordance with the present invention, with its crankshaft angle at 540 degree for the first cylinder after starting point.

Referring now to FIG. 13, an operation diagram of EAV inside HEIHE-2 in accordance with the present invention is shown, with the crankshaft angle of HEIHE-2 is at the end of power stroke of 540 degree CA. The first piston 17 has reached BC, making the exhaust duct 47 fully open to the cylinder 11. At this moment, the expanding exhaust gas has already pushed the pressure head 46 as well as EAV piston 43 upward to the top side of the upper EAV cylinder 42. As a result, EAV 16 is fully open. The exhaust inside the cylinder 11 could now be discharged or transferred through fluid channel 49 and EAV piston opening 44.

Figure 14:
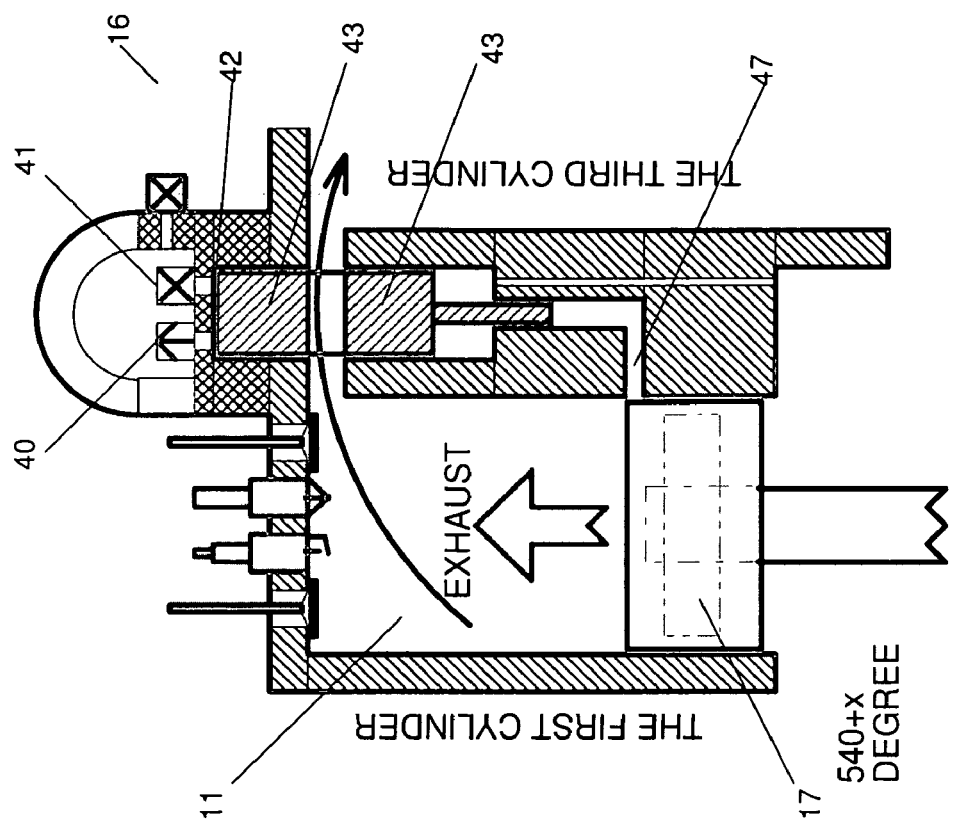
FIG. 14 is an operation diagram of exhaust actuated valve (EAV) of HEIHE-2 in accordance with the present invention, with its crankshaft angle at 540 plus x degree for the first cylinder after starting point.

Referring now to FIG. 14, an operation diagram of EAV inside HEIHE-2 in accordance with the present invention is shown, with the crankshaft angle of HEIHE-2 is at the beginning of exhaust stroke of 540 plus x degree CA, that is, x degree after BC. The first piston 17 is moving upward beyond the opening of exhaust duct 47 in cylinder 11. At this moment, the pressure inside exhaust duct 47 begins to reduce to crankshaft pressure gradually. But the EAV piston 43 would be held at the top side of the upper EAV cylinder 42 by vacuum. This vacuum comes from the cutting off of both check valve 40 and switching valve 41. So EAV16 is kept open for working fluid transfer.

Figure 15:
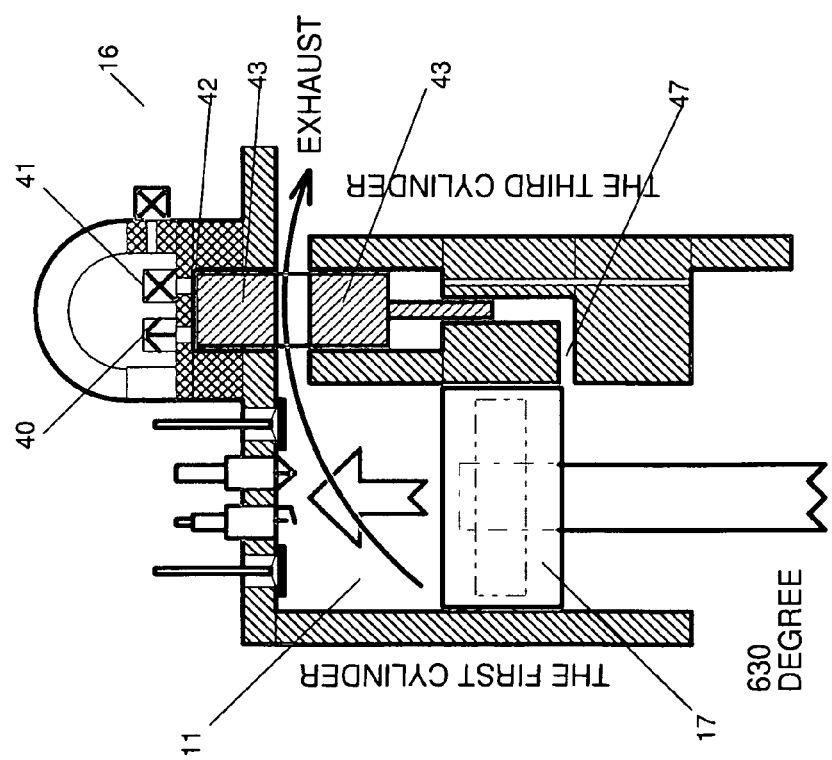
FIG. 15 is an operation diagram of exhaust actuated valve (EAV) of HEIHE-2 in accordance with the present invention, with its crankshaft angle at 630 degree for the first cylinder after starting point.

Referring now to FIG. 15, an operation diagram of EAV inside HEIHE-2 in accordance with the present invention is shown, with the crankshaft angle of HEIHE-2 is at the middle of exhaust stroke of 630 degree CA. The first piston 17 is moving upward in cylinder 11. At this moment, the pressure inside exhaust duct 47 has been reduced to crankshaft pressure. But the EAV piston 43 would be kept holding at the top side of the upper EAV cylinder 42 by vacuum. Both check valve 40 and switching valve 41 keep cutting off. So EAV16 is kept open for continuous working fluid transfer.

Figure 16:
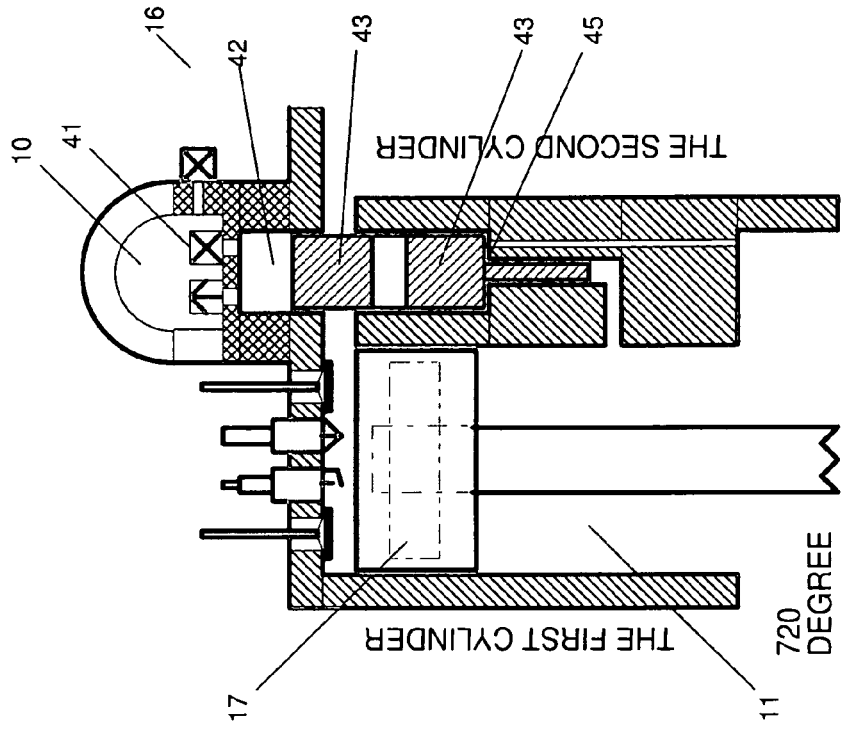
FIG. 16 is an operation diagram of exhaust actuated valve (EAV) of HEIHE-2 in accordance with the present invention, with its crankshaft angle at 720 degree for the first cylinder after starting point.

Referring now to FIG. 16, an operation diagram of EAV inside HEIHE-2 in accordance with the present invention is shown, with the crankshaft angle of HEIHE-2 is at the end of exhaust stroke of 720 degree CA. The first piston 17 has reached TC, completing the exhaust or transfer stroke. At this moment, a reset pulse generated by the microcomputer drives the switching valve 41 open. As a result, the pressured air from EAV pressure chamber 10 rushes into the upper EAV cylinder 42, pushing EAV piston 43 downward. So EAV 16 is closed again. Once EAV piston 43 goes down to the bottom side of lower EAV cylinder 45, the reset pulse applied to switching valve 41 could be removed. Thus switching valve 41 is shut off. But the positive pressure Peav inside the upper EAV cylinder 42 would keep EAV 16 closed until the next exhaust or transfer stroke.

Figure 17:
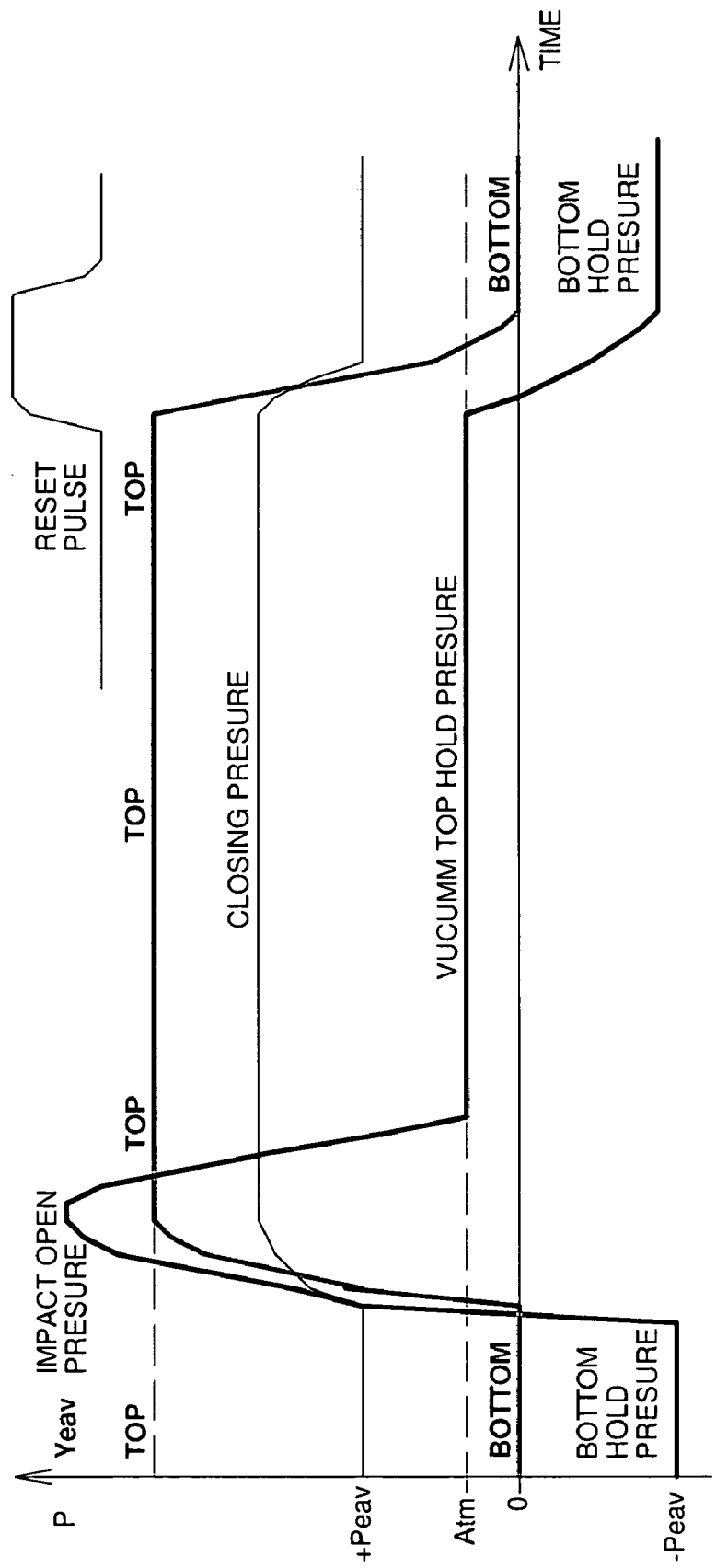
FIG. 17 is an operating pressure difference and vertical displacement diagram of exhaust actuated valve (EAV) of HEIHE-2 in accordance with the present invention.

A waveform diagram of the above EAV actuation process in accordance with the present invention is shown in FIG. 17. It shows us the relationship between the operating pressure difference and the EAV vertical displacement (Yeav).

EAV doesn't consume mechanical power like those mechanical lifting valves inside the conventional ICE, nor consumes electrical power like electromagnetic valves. It makes use of exhausting gas energy that would be discharged, leaving more valuable engine mechanical power to drive the load. This would definitely contribute to engine mechanical efficiency improvement. Further, it could be built between triple cylinders, shortening the working fluid transfer channels. As a result, thermodynamic efficiency would also be increased. The only problem is its working fluid exhaust gas would be released into the crankshaft case. However, this phenomenon would benefit to Exhaust Gas Recirculation, or EGR. Used exhaust gas discharged from EAV would have been cooled down by heat absorption of engine block during exhaust stroke, and then, being sucked into intake manifold, resulting cooler EGR. Cooler EGR would contribute positive gain toward fuel conversion efficiency as well as emission control. Obviously, such kind of cooler EGR would not require any dedicated hardware.

Although EAV is energy efficient, it needs exhaust energy to operate. So it could only be utilized as exhaust valve. Other non-exhaust valves may use other kinds of valves instead of EAV. In this case, electromagnetically actuated valves could be the best choice. They could not only be controlled by computer, but also provide fast control responds and valve timing flexibility. Such nice feature would be helpful to improve fluid volumetric efficiency dynamically. Their camless actuation could save mechanical power loss by friction, enhancing mechanical efficiency of HEIHE-2. At least, conventional camshaft actuated valves could also be used, but valve timing flexibility and mechanical efficiency would be suffered.

Figure 18:
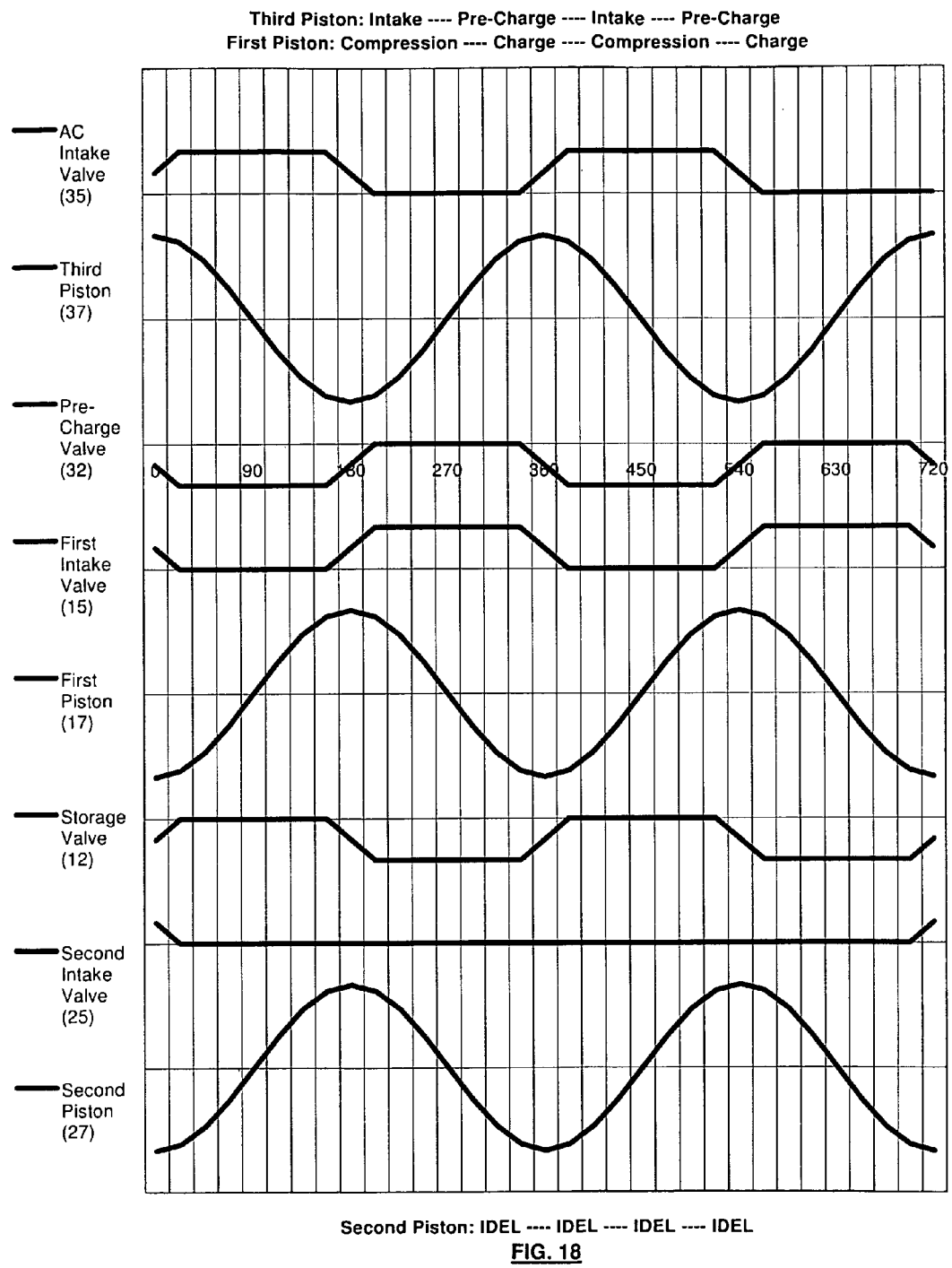
FIG. 18 is a sequence of events diagram of HEIHE-2 working at air compression (AC) mode in accordance with the present invention.

FIG. 18 is a sequence of events diagram of HEIHE-2 working at air compressor (AC) mode in accordance with the present invention, where piston displacements and valve movements are shown along with the crankshaft angle. During air compressor (AC) mode, HEIHE-2 works as a two-stage air compressor, with the third (larger) cylinder working at primary compression stage, while the first (smaller) cylinder working at secondary compression stage. The compressed air pressure is lower after the primary compression stage, but would be pumped higher after the secondary compression stage. AC mode needs only 4 strokes scheduled in 2 periods, covering 360 degree of crankshaft rotation. Thus in a full HEIHE-2 working cycle of 2 complete revolutions, or 720 degree CA, HEIHE-2 would complete 2 AC working cycles repeatedly. The related 4 strokes could be listed as follows:

1] The first period, from 0 degree to 180 degree CA, intake stroke in the third cylinder, with the third piston moves down from TC to BC; compression stroke in the first cylinder, with the first piston moves up from BC to TC. Both AC intake valve 35 and storage valve 12 open during this period.

2] The second period, from 180 degree to 360 degree CA, pre-charge stroke in the third cylinder, with the third piston moves up from BC to TC; and charge stroke in the first cylinder, with the first piston moves down from TC to BC. Both pre-charge valve 32 and intake valve 15 open during this period.

Figure 19:
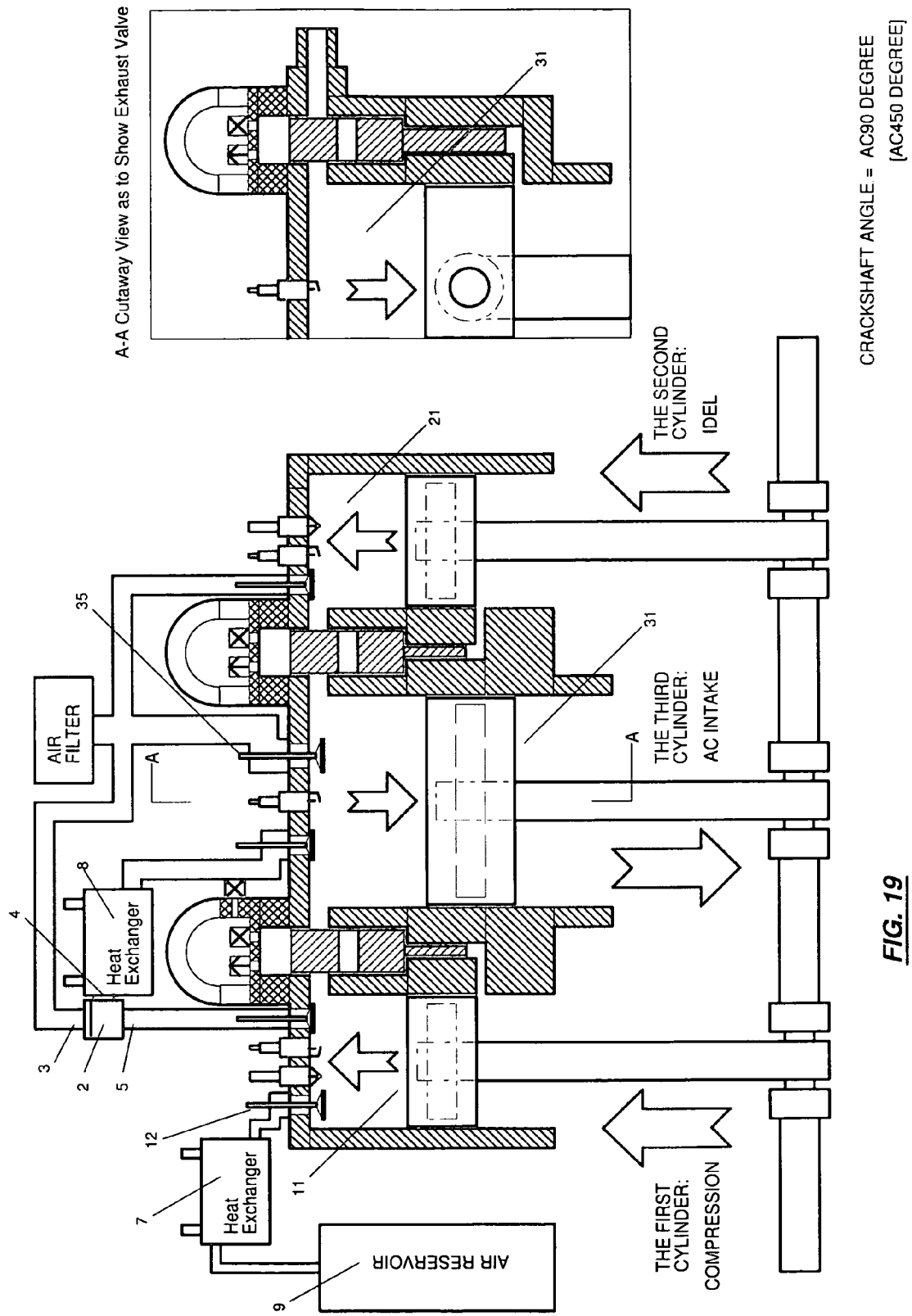
FIG. 19 is an operation diagram of HEIHE-2 working at air compression (AC) mode in accordance with the present invention, with its crankshaft angle at 90 degree or 450 degree after starting point.

Now referring to FIG. 19, an operation diagram of HEIHE-2 working at air compressor (AC) mode in accordance with the present invention is shown, with the crankshaft angle of HEIHE-2 is at the first period of AC mode, 90 degree CA. The third piston is moving downward while the first piston is moving upward. AC intake valve 35 is open, so the fresh air is sucking into the third cylinder 31. Storage valve 12 is also open, so the previously compressed air from previous working period is further compressed from the first cylinder 11 into air storage reservoir 9 through a first heat exchanger 7. This completes the secondary stage of two-stage air compression. Other valves would remain closed. During this period, both intake stroke and compression stroke happen in the third cylinder and the first cylinder respectively.

During AC mode, the second cylinder would keep idle, with its both intake valve 25 and transfer valve 26 keeping constantly closed so as to eliminate the fluid pumping loss, while the compression process inside the second cylinder would act like an air-spring, consuming no power. During the air hybrid braking power regeneration mode, intake switch valve 2 turns on the passage between port 4 and port 5 while cutting off port 3, so as the air flow charged into the first cylinder is from the third cylinder instead of the air filter.

Figure 20:
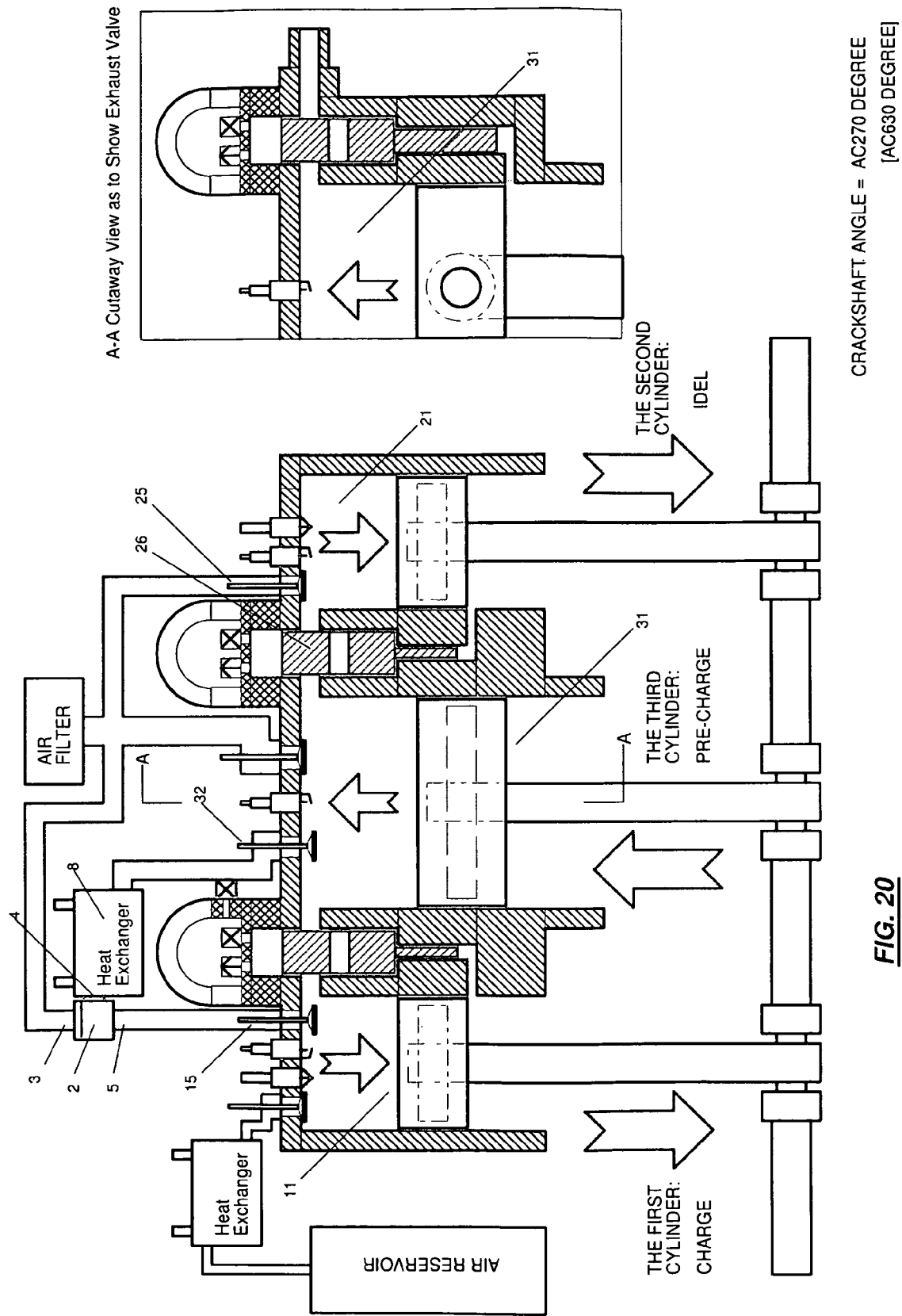
FIG. 20 is an operation diagram of HEIHE-2 working at air compression (AC) mode in accordance with the present invention, with its crankshaft angle at 270 degree or 630 degree after starting point.

Referring now to FIG. 20, an operation diagram of HEIHE-2 working at air compressor (AC) mode in accordance with the present invention is shown, with the crankshaft angle of HEIHE-2 is at the second period of AC mode, 270 degree CA. The third piston is moving upward while the first piston is moving downward. Pre-charge valve 32 is open, so the fresh air inside the third cylinder 31 is pre-charged into the first cylinder 11 through a second heat exchanger 8. Intake valve 15 is also open, so the pressure increasing pre-charged air from the third cylinder is charging into the first cylinder. Since the first cylinder has smaller volume than that of the third cylinder, the fresh air transferred from the third cylinder into the first cylinder is compressed. This completes the primary stage of two-stage air compression. Other valves would remain closed. During this period, both pre-charge stroke and charge stroke happen in the third cylinder and the first cylinder respectively.

Figure 21:
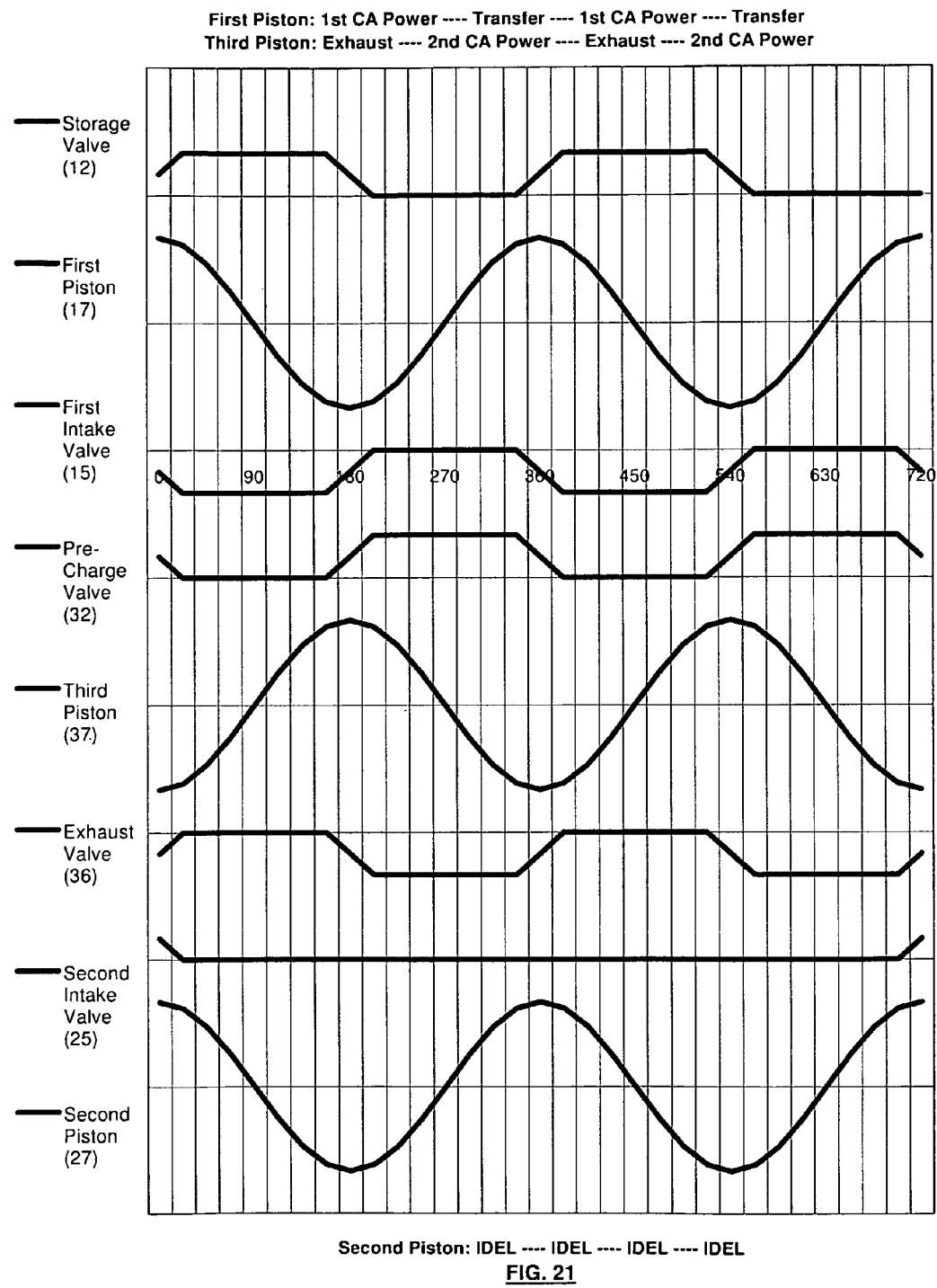
FIG. 21 is a sequence of events diagram of HEIHE-2 working at compressed air engine (CAE) mode in accordance with the present invention.

FIG. 21 is a sequence of events diagram of HEIHE-2 working at compressed air engine (CAE) mode in accordance with the present invention, where piston displacements and valve movements are shown along with the crankshaft angle. During compressed air engine (CAE) mode, HEIHE-2 works as a two-stage CAE, with the first (smaller) cylinder working at primary expansion stage, while the third (larger) cylinder working at secondary expansion stage. The compressed air pressure is higher toward the primary expansion stage, but would become lower toward the secondary expansion stage. To the present invention of HEIHE-2, compressed air engine (CAE) mode is simply the mechanically inversed operation mode of air compressor (AC) mode. CAE mode needs only 4 strokes scheduled in 2 periods, covering 360 degree of crankshaft rotation. Thus in a full HEIHE-2 working period of 2 complete revolutions, or 720 degree CA, HEIHE-2 would complete 2 CAE working cycles repeatedly. The related 4 strokes could be listed as follows:

1] The first period, from 0 degree to 180 degree CA, primary CAE power stroke in the first cylinder, with the first piston moves down from TC to BC; CAE exhaust stroke in the third cylinder, with the third piston moves up from BC to TC. Both storage valve 12 and exhaust valve (EAV) 36 open during this period.

2] The second period, from 180 degree to 360 degree CA, CAE transfer stroke in the first cylinder, with the first piston moves up from BC to TC; and secondary CAE power stroke in the third cylinder, with the third piston moves down from TC to BC. Both intake valve 15 and pre-charge valve 32 open during this period. Inter-cylinder transfer valve 16 is disabled in advance, it will not open during this period.

Figure 22:
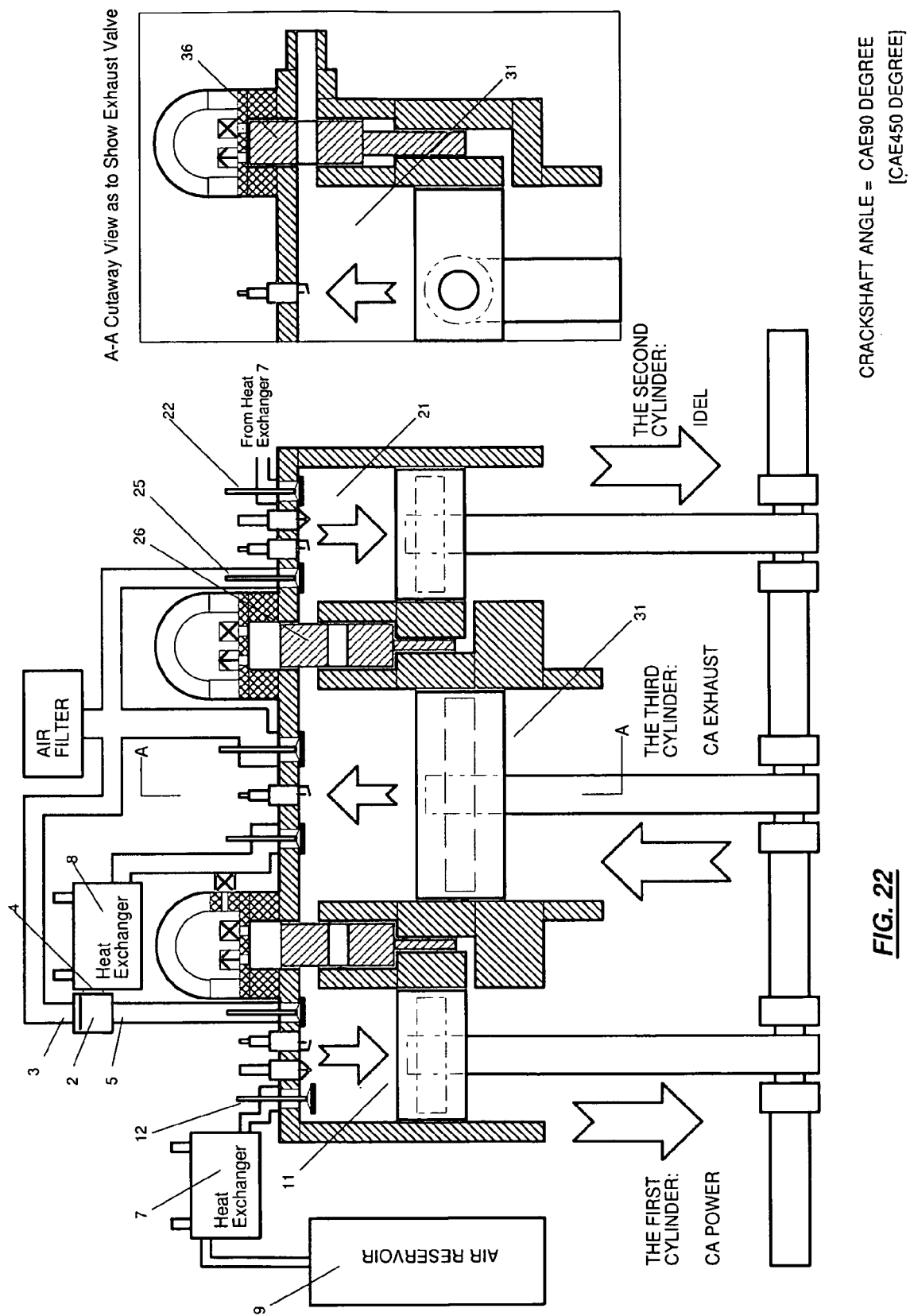
FIG. 22 is an operation diagram of HEIHE-2 working at compressed air engine (CAE) mode in accordance with the present invention, with its crankshaft angle at 90 degree or 450 degree after starting point.

Now referring to FIG. 22, an operation diagram of HEIHE-2 working at compressed air engine (CAE) mode in accordance with the present invention is shown, with the crankshaft angle of HEIHE-2 is at the first period of CAE mode, 90 degree CA. The first piston is moving downward while the third piston is moving upward. Storage valve 12 is open, so the compressed air stored inside the air reservoir 9 is fed into the first cylinder 11 through the first heat exchanger 7, forcing the first piston moving down. Exhaust valve (EAV) 36 is also open, so the previously expanded air from previous working cycle is exhausted from the third cylinder 31 to outside of HEIHE-2. This completes the primary stage of two-stage compressed air expansion. Other valves would remain closed. During this period, both primary CAE power stroke and CAE exhaust stroke happen in the first cylinder and the third cylinder respectively.

During CAE mode, the second cylinder would keep idle, with its both intake valve 25 and transfer valve 26 keeping constantly closed so as to eliminate the fluid pumping loss, while the compression process inside the second cylinder would act like an air-spring, consuming no power. During the air hybrid braking power regeneration mode, intake switch valve 2 turns on the passage between port 4 and port 5 while cutting off port 3, so that the air flow discharged from the first cylinder is fed into the third cylinder through heat exchanger 8 instead of the air filter.

Figure 23:
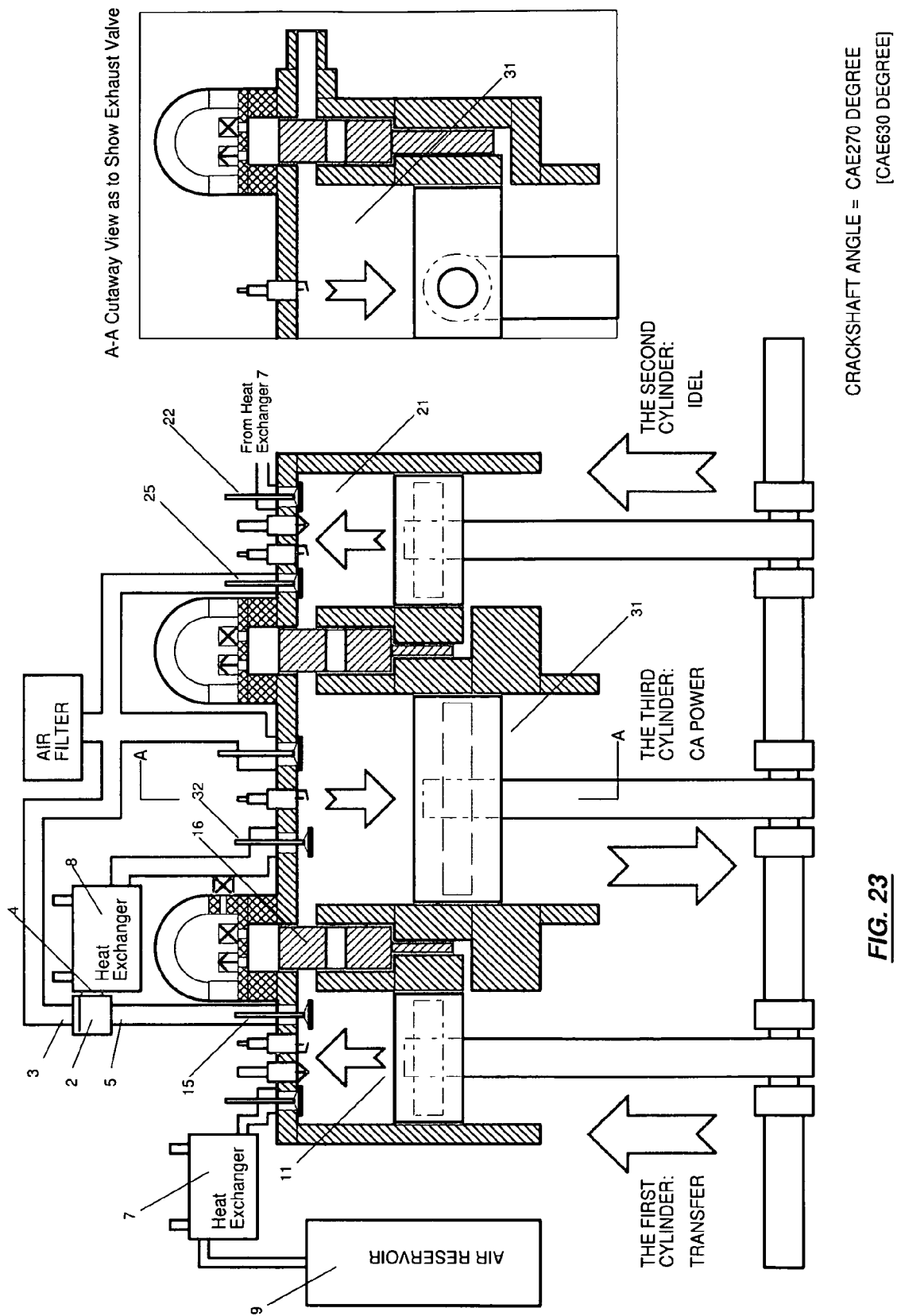
FIG. 23 is an operation diagram of HEIHE-2 working at compressed air engine (CAE) mode in accordance with the present invention, with its crankshaft angle at 270 degree or 630 degree after starting point.

Referring now to FIG. 23, an operation diagram of HEIHE-2 working at compressed air engine (CAE) mode in accordance with the present invention is shown, with the crankshaft angle of HEIHE-2 is at the second period of CAE mode, 270 degree CA. The first piston is moving upward while the third piston is moving downward. Inter-cylinder transfer valve (EAV 16) is disabled in advance and is kept closed, but both intake valve 15 and pre-charge valve 32 are open. So the expanded compressed air inside the first cylinder 11 is being transferred to the third cylinder 31 through the second heat exchanger 8. Since the third cylinder has larger volume than that of the first cylinder, the expanded compressed air transferred from the first cylinder into the third cylinder is further expanded, forcing the third piston moving down. This completes the secondary stage of two-stage air expansion. Other valves would remain closed. During this period, both CAE transfer stroke and secondary CAE power stroke happen in the first cylinder and the third cylinder respectively.

In case high power boost is required during CAE mode, as in the case of starting from stop or driving heavy load, compressed air from the air reservoir 9 could be introduced into the second cylinder 21 through power boost valve 22 on top of the second cylinder. Meanwhile, intake valve 25 would be closed for holding the air pressure inside the second cylinder. As a result, CAE power output would be temporally doubled, with both the first cylinder and the second cylinder contributing positive power output in parallel. But the energy efficiency would be reduced during power boost due to the limited secondary expansion space and higher exhaust pressure.

During the process of air compression, heat would be generated and the temperature of compressed air would be increased. This would decrease air storage capacity and reduce AC mode efficiency. In other side, during the process of compressed air expansion, heat would be absorbed and the temperature of compressed air would be decreased. This would decrease volumetric capacity of the compressed air and reduce CAE mode efficiency. So two-stage heat exchangers 7 and 8 could be utilized to cool down the compressed air during the AC mode, and to heat up the compressed air during the CAE mode. In order to store heat energy generated during the AC mode for later use during the CAE mode, a thermos tank could be used to collect heat energy during the AC mode, to store heat energy during the idle mode, and to release heat energy during the CAE mode. As a result, thermal efficiencies during both AC mode and CAE mode would be improved, and the heat loss would be captured for air hybrid power regeneration.

Figure 24:
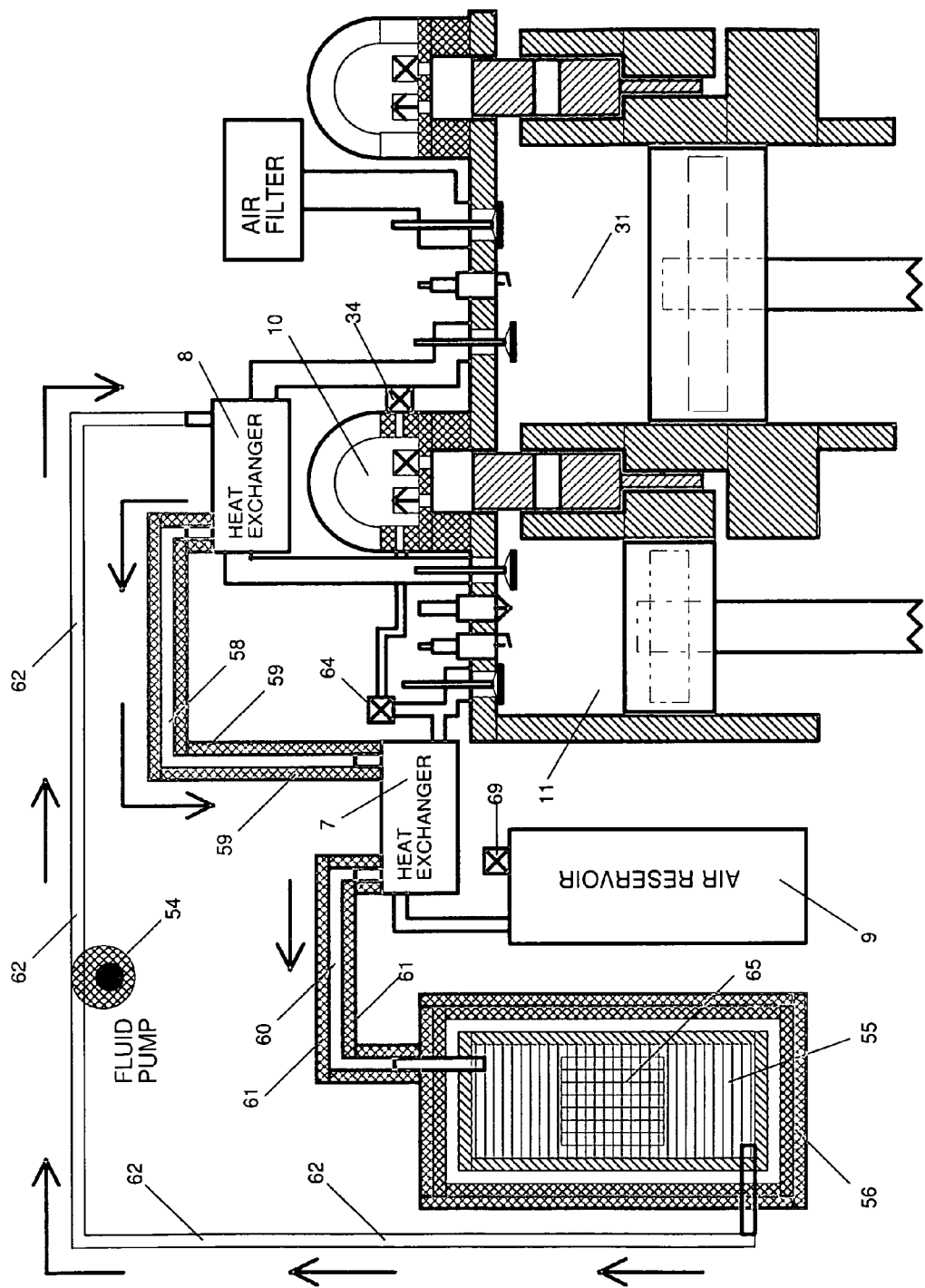
FIG. 24 is a pneumatic storage and thermal storage system diagram of HEIHE-2 supporting both AC mode and CAE mode in accordance with the present invention.

Now referring to FIG. 24, a heat circulation diagram of HEIHE-2 in accordance with the present invention is shown. A first heat exchanger 7 is installed between air reservoir 9 and the first cylinder 11. A second heat exchanger 8 is installed between the first cylinder 11 and the third cylinder 31. Both of the heat exchangers 7 and 8 are thermally cascaded with a heat conveying fluid pump 54 and a thermos tank 56. Thermos tank 56 would comprise vacuum insulation structure with built-in electrical heating element 65, and be filled with heat conveying fluid 55. They form a closed heat conveying fluid circulation loop through heat conveying fluid conduits 58, 60 and 62. The heated sections of the heat conveying fluid conduits 58 and 60 would be covered by thermal insulations 59 and 61. During the AC mode, heat conveying fluid pump 54 would force heat conveying fluid to circulate clockwise, as shown by the arrows around the heat conveying fluid conduits. The heat conveying fluid 55 with lower temperature would come out of the bottom area of thermos tank 56, pass through heat conveying fluid pump 54, enter the second heat exchanger 8, cooling down the compressed air discharged from the third cylinder 31. The heat conveying fluid would then continue to flow into the first heat exchanger 7, cooling down the compressed air discharged from the first cylinder 11. At last, the heated heat conveying fluid is fed back to the thermos tank 56 for heat energy storage. At meantime of the compressed air cooling down, the heat energy would be collected, transferred and stored into the thermos tank 56. During the CAE mode, the heat conveying fluid loop would circulate in a reversed direction. Heat conveying fluid pump 54 forces heat conveying fluid running anti-clockwise (no arrow is shown). The heat conveying fluid 55 with higher temperature would come out of the top area of thermos tank 56, enter the first heat exchanger 7, heating up the compressed air to be fed into the first cylinder 11. The heat conveying fluid would then continue to flow into the second heat exchanger 8, heating up the compressed air to be fed into the third cylinder 31. At last, the used heat conveying fluid is fed back to the bottom of thermos tank 56 through heat conveying fluid pump 54.

In FIG. 24, water based coolant could be used as heat conveying fluid 55 as long as the operating temperature is lower than 120 degree Celsius. In case of operating temperature reaching up to 250 degree Celsius, heat resistant oil-based fluid must be used as heat conveying fluid, such as silicone oil, mineral oil or even engine lubricate oil. Built-in electrical heating element 65 inside thermos tank 56 is utilized to heat up heat conveying fluid 55, so as to convert electrical energy into heat energy stored inside thermos tank 56, obtaining "Plug-In" energy charging and storage by heat.

As a thermal energy storage device, thermos tank 56 could also be used to capture and store thermal energy from engine exhaust. CAE mode of HEIHE-2 in accordance with the present invention would convert such restored thermal energy into mechanical power later.

Still in FIG. 24, switching valve 64 is utilized to regulate the compressed air flow between pressure chamber 10 and air reservoir 9. As has been mentioned previously, pressure chamber 10 requires a proper working pressure. If the pressure inside pressure chamber 10 becomes much higher than required, and/or when HEIHE-2 does not need to consume some of the pre-charging air flow thus branch some more fresh air into pressure chamber 10, then switching valve 64 would open electromagnetically to release the pressure, and to store pneumatic energy for later use. In case HEIHE-2 is starting from stop, there is no enough working pressure inside pressure chamber 10, then switching valve 64 would also open as to feed pressure chamber 10 with a proper working pressure immediately by compressed air from air reservoir 9.

As we could see from the above, heating compressed air in two stages by stored heat energy would causes the working fluid expanding to much larger volume, thus obtaining much higher kinetic energy to do the expansion work. This could be an effective way to increase thermal efficiency of air hybrid braking power recovery.

The integration of both AC mode and CAE mode into HEIHE-2 would make air hybrid vehicle drivetrain possible. The benefit of air hybrid drivetrain integrated inside HEIHE-2 could require no on-board rechargeable energy storage system (RESS) like the one that dominates the electric hybrid drivetrain, where motor-generator and battery are required. This would not only greatly reduce the weight and complexity associated with the electric hybrid drivetrain integration, but also cut a sizable costs form motor-generator and battery. Technically, battery has limited energy density and constrained charging and discharging rate, therefore, it may not have enough capability to handle rapid energy exchange during regenerative braking. Battery also has a limited service life, usually shorter than the vehicle it serves.

Electric hybrid would require 5 successive energy conversions to complete the energy regeneration loop—mechanical to electrical; electrical to chemical; chemical to chemical (energy storage); chemical to electrical; electrical to mechanical. Suppose each of the above conversions has an efficiency as high as 90%, then the overall regeneration loop efficiency would be 90% to the 5th power, or 59%. In contrast, air hybrid energy regeneration loop needs only 2 conversions—mechanical to pneumatic and pneumatic to mechanical. Suppose each of these 2 conversions has an efficiency of 81%, then the overall regeneration loop efficiency would be 81% times 81%, or 66%. So we could conclude that air hybrid has higher energy regeneration efficiency than that of electric hybrid, and the efficiency gain of air hybrid over electric hybrid would be at least 10%.

Moreover, energy regenerated by HEIHE-2 would be stored in both air reservoir and thermos tank. The combination of these two storage devices could provide much larger energy density than that of rechargeable battery only in electric hybrid drivetrain. Compressed air at a pressure of 50 bar already has an energy density equivalent to up-to-date Lithium-ion Battery, and compressing the air pressure 4 times higher up to 200 bar would not be an unusual operation. In the other hand, if water-based coolant in a thermos tank could rise temperature for 53 degree Celsius, then its energy density is already equivalent to that of conventional nickel metal hydride battery (NiMH Battery), and rising coolant temperature for 4 times up to 212 degree Celsius would not be a difficulty action in case the coolant is oil-based. Due to lower specific heat value of oil-based coolant such as mineral oil, it still provides 3 times of heat capacity when being heated up to the same level. Obviously, energy storage density is a bottleneck of electric hybrid drivetrain. In the above energy density examples, 4 times of pneumatic energy plus 3 times of thermal energy would make energy density from regeneration energy storage system of HEIHE-2 7 times larger than that of chemical batteries. Therefore, the total possible energy density from regeneration energy storage system of HEIHE-2 would be definitely superior to that of electric hybrid. This great feature of air hybrid powertrain could drive vehicle for longer mileage once fully charged before the next charge is required. If the charge is powered by household electrical power grid, then a long range "Plug-In" hybrid powertrain could be obtained. Another great feature of air hybrid powertrain could be, the dual energy storage devices involved would support double rate of energy exchange, absorbing sudden braking energy impact in a greater rate, and then releasing peak energy for vehicle to start from stop or to accelerate.

In order to obtain "Plug-In" hybrid powertrain, an external charging port 69 could be installed onto compressed air reservoir 9, as shown in FIG. 24, so as to store pneumatic energy through external charging. The charging could be from external compressed air source. Meanwhile, electrical heating element 65 could be built into thermos tank 56, so as to heat up heat conveying fluid 55 directly for thermal energy storage through household electrical power grid. Utilizing household electrical power to charge energy storage devices with both compressed air and heat in regeneration energy storage system of HEIHE-2, would not only make HEIHE-2 into a realistic "Plug-In" hybrid powertrain, but also become a method of energy feeding into the future "Plug-In" hybrid vehicles.

As has been mentioned before, this method could have higher efficiency and faster charging speed than those of energy storage of conventional chemical batteries.

The last thing we need to count for in air hybrid drivetrain integrated inside HEIHE-2 could be the heat exchangers. Obviously they are not 100% efficient, but they are dedicated to thermal to thermal conversion among fluids, their efficiency could be very high and their operation condition could be very desirable. Because they are naturally designed for thermal exchange. In contrast, their countpart in an electric hybrid drivetrain is power converter, which converts battery DC power to AC power required by drivetrain motors. Although the efficiency of power converter is very high but still not 100%. Suppose its efficiency is as high as 93%, then the rest of 7% energy would be lost in the format of heat. This unwanted heat could not only cause unexpected energy loss, but also cause overheat or even thermal breakdown of power electronics. As a result, a dedicated cooling system has to be applied to power converter, causing extra weight, cost and complexity. If the designer plans to smartly combine power converter cooling system with the existing ICE cooling system, then power converter and its electronics would work in a higher temperature, introducing more challenge and problem to solve. Obviously, thermal management is another bottleneck of electric hybrid drivetrain. Therefore, straight forward energy format in air hybrid drivetrain integrated inside HEIHE-2 would have a natural advantage over that of electric hybrid drivetrain.

As has been mentioned during the descriptions of FIG. 6 and FIG. 10 previously, the combustible gases exist in the cylinders during the secondary power strokes due to both thermal cracking and chemical cracking processes. These cracking processes may happen slowly and gradually along the secondary power strokes. So multiple firing sparks must be applied to both of the cylinders during both transfer stroke and secondary combined fluids power stroke. At least the firings should be made along the secondary power strokes when the concentration of combustible gases reaches the highest point. During the further development, plasma discharge could also be applied into the cylinders, as to make extra volumetric expansion during the combined fluids power strokes.

As has been mentioned previously, secondary air-fuel combustion contributes to secondary air-fuel power stroke without consuming extra fuel. Thus fuel conversion efficiency would be greatly increased. More than that, the third cylinder could work as a thermal reactor that would remove gaseous pollutants from exhaust gases generated by primary air-fuel combustion. It is well known that even without a catalyst, hydrocarbons would be oxidized under a temperature in excess of 600 degree Celsius as long as it resides long enough in such a temperature. Carbon monoxide would also be oxidized over a temperature in excess of 700 degree Celsius. Such kind of temperature for secondary combustion could be very easy to obtain for a gasoline-fueled engine, since the exhaust temperature from the primary air-fuel combustion could be as high as 850 degree Celsius during high power operation.

Another well-known fact is that oxidation of combustible gases generates heat. For example, oxidation of 1.5% carbon monoxide would cause 220 degree Celsius temperature rise. As the oxidation and the accompany heat release happen inside the third cylinder, their thermal energy would be captured and converted to useful mechanical power. To keep the oxidation process going on, we need not only to inject fresh air into the first cylinder and the second cylinder, which is a must fluid combining process for HEIHE-2, but also to keep the reaction temperature high enough. In order to keep the reaction temperature high enough, fuel-rich combustion would be expected during the primary combustion process happened inside the first cylinder and the second cylinder. Fuel-rich combustion would also provide higher carbon monoxide and hydrocarbon contents in its combustion products, enhancing the secondary combustion. Therefore, some kind of staged combustion method would be expected for the present invention. And, triple compound cylinder structure of HEIHE-2 in accordance with the present invention would be a natural thermodynamic mechanism to implement such a staged combustion. It is no doubt that a thermodynamically and mechanically well-matched mechanical structure yields higher fuel conversion efficiency, and triple compound cylinders of HEIHE-2 could definitely be such kind of mechanical structure.

Another benefit of combustion inside triple compound cylinders would be staged combustion, which intentionally makes primary combustion of fuel-rich air-fuel mixture in either the first cylinder or the second cylinder, and then the resulted combustion products are fed into the third cylinder for oxygen-rich secondary combustion. As we already learnt from the descriptions of FIG. 5 and FIG. 9 previously, that either the first cylinder or the second cylinder has been scheduled to implement fluid injection process before turning to execute combined fluids transfer stroke, so the fresh air would be injected into the combustion chamber of either the first cylinder or the second cylinder with outside pressure, and also would be heated up by air-fuel combustion products and the remaining heat inside the cylinder. Therefore, the resulting pressured warm fresh air inside combustion chamber would become nature oxidizer for secondary combustion inside either the first cylinder or the second cylinder, making the secondary combustion an oxygen-rich lean burn. Such secondary combustion would keep in action while the combined working fluids are being transferred into the third cylinder, making further combustion and expansion there until they are discharged through exhaust stroke. In this way, two-stage combustion could thus be implemented, which would further contribute to the gain of HEIHE-2 fuel conversion efficiency.

In order to implement staged combustion, some oxygen-rich fluids are preferred to be the fluid for injecting into HEIHE-2, such as compressed air, or liquid air. Comparing to compressed air under different pressures, liquid air has the highest mass density and the highest energy density, yet it could be stored at atmosphere pressure with cryogenic temperature. Liquid air could provide HEIHE-2 with useful energy to the last drop like gasoline, thus it would be highly recommended as the secondary fuel of HEIHE-2.

Once oxygen-rich fluid is injected into HEIHE-2, its final exhaust displaced from the third cylinder would also become oxygen-rich, with higher oxygen content. The higher oxygen content in the exhaust would help to oxidize the emission gases, resulting much cleaner engine exhaust. However, the original oxygen balance determined by stoichiometric air-fuel ratio, or Lambda equals to unity, would no longer exist. Lambda valve in accordance with the present invention would become greater than unity, or even up to two or three. In this case, conventional narrow band oxygen sensor would fail to work, thus being unable to close fuel control loop. To close fuel control loop under new oxygen balance, or high Lambda valve, caused by oxygen-rich fluid injection, a wide band oxygen sensor could be used to detect exhaust gas flow of HEIHE-2. Wide band oxygen sensor signal would be processed by fuel loop control module, and be converted into the format acceptable by other Engine Control Unit (ECU), in case fuel loop needs to be controlled jointly with other ECU. LSU-4.2 type wide band oxygen sensor manufactured by Bosch with part number 0-258-007-057 is recommended for this application. It could sense as wide as 21% of wide band oxygen content, the oxygen content of pure air, or infinity Lambda valve. In extreme case, Lambda valve may reach infinity if HEIHE-2 were powered by 100% compressed air, or liquid air, without combusting fossil fuel.

In case of diesel or biodiesel combustion inside HEIHE-2 disclosed in the present invention, soot and/or particulates that cause headache problems in conventional diesel-fueled ICE could be processed by the staged combustion. Once soot and/or particulates were generated by primary combustion inside either the first cylinder or the second cylinder, they would be combined with the injected fresh air, being oxidized while being transferred with combined fluids into the third cylinder. Normally, diesel particulate matter would be ignited at about 500 to 600 degree Celsius. This is above the normal temperature of diesel exhaust discharged from either the first cylinder or the second cylinder (300 to 500 degree Celsius). However, with the help of in-cylinder catalytic meshes, the ignition temperature of diesel particulate matter would be reduced to about 250 degree Celsius. In this way, a large percentage of diesel particulate matter could be burned out. Post fuel injection that injects tiny fuel into either the first cylinder or the second cylinder, at the end of primary air-fuel combustion and expansion stroke, may be utilized to enhance the secondary combustion. As a result, diesel particulate matter would be mostly oxidized while the released thermal energy from oxidation would be captured by the third cylinder.

Figure 25:
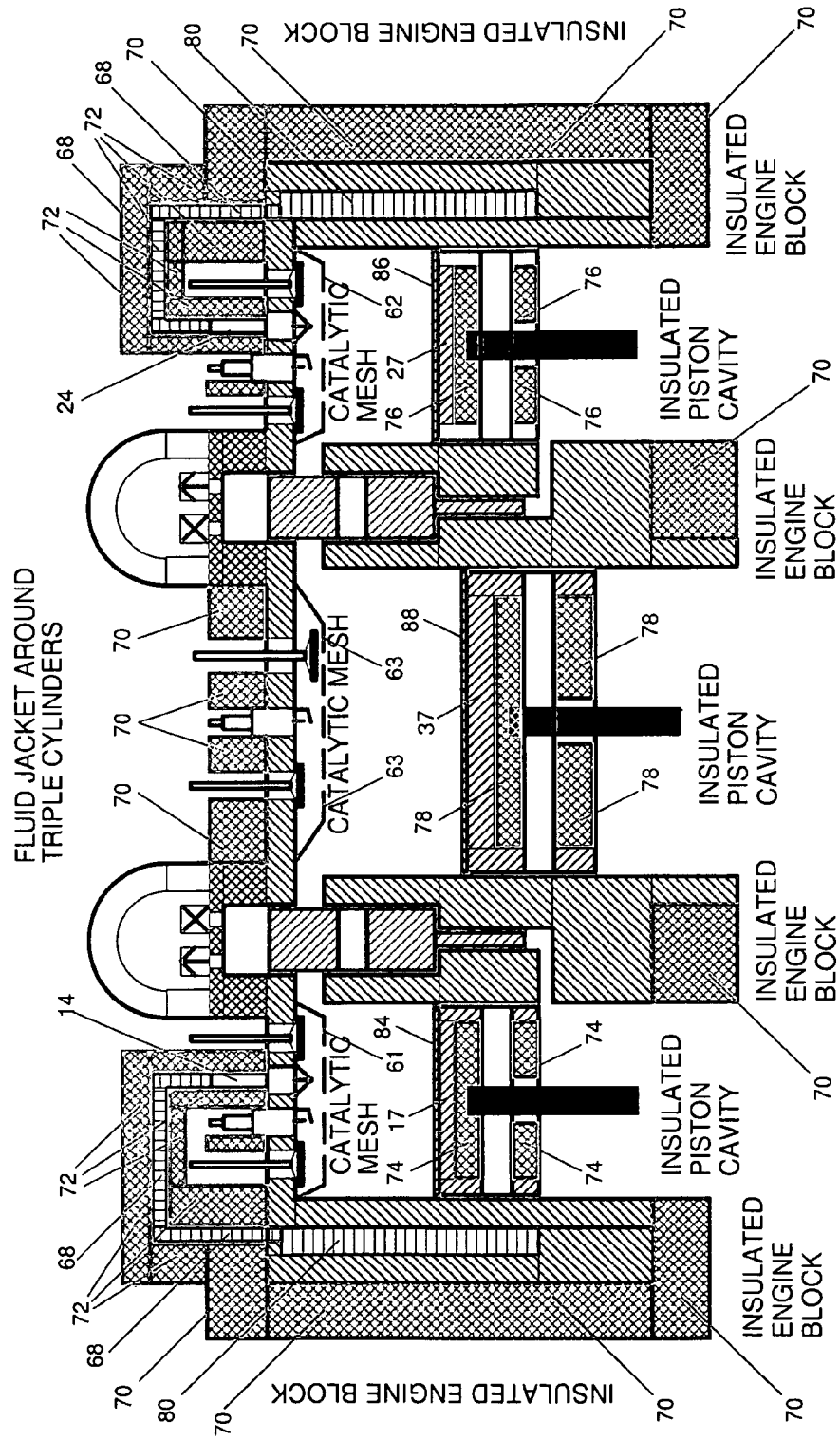
FIG. 25 is a thermodynamic structure diagram of HEIHE-2 in accordance with the present invention, with its thermal insulated engine block, thermal insulated piston crowns and cavities, inter-cylinder heat conveying fluid jacket as fluid super-heater and in-cylinder catalytic meshes.

Referring now to FIG. 25, a structure diagram of HEIHE-2 with in-cylinder catalytic meshes and engine block thermal insulation in accordance with the present invention is shown. The triple cylinders of HEIHE-2 have catalytic metal meshes 61, 62 and 63 built into the combustion chamber. They are heated up to the temperature of combustion chamber during the air-fuel power strokes, and remain heated during the coming transfer and secondary power strokes. These heated catalytic metals then would enhance the process of steam cracking into hydrogen and oxygen under high temperature of combustion chamber, and also to enhance the process of steam cracking and/or hydrocracking of unburned hydrocarbons. All of these cracking processes would result combustible gases that carry heat energy. In the other side, the heated catalytic metals would also promote the secondary combustion of air-fuel combustion products, or to further promote exhaust oxidation with fresh air, as to reduce exhaust emissions while harnessing heat energy released from the secondary combustion of air-fuel combustion products. All of those cracking processes happened in the first cylinder and/or the second cylinder could also be repeated here in the third cylinder, if the temperature allows.

In other word, in-cylinder catalytic metal meshes 61, 62 and 63 could be the result of integrating catalytic converter, a heat-releasing device inevitably used along with conventional ICE, into the present invention, HEIHE-2. This perfect integration not only contributes to reduce exhaust emissions, but also recovers heat energy released from the secondary combustion and catalytic conversion. As a result, HEIHE-2 would obtain another gain of efficiency, exhaust emission would be reduced to very low level that conventional off-engine catalytic converter may be greatly downsized, or even no longer required. This would also benefit to cost reduction.

Still in FIG. 25, inner-jacket fluid super-heater could be built into heat conveying fluid jacket 80 around the first cylinder and the second cylinder to pre-heat the fluid to be injected into the first cylinder and the second cylinder. Fluid conduits 68 would connect superheated injection fluid with fluid injectors 14 and 24. The inner-jacket fluid super-heater would absorb the heat escaping from the cylinder wall, and heat up the fluid to be injected into super-heated state. As a result, the escaped heat energy could be recaptured and fed back into the cylinder for doing further work, obtaining super-heated combined fluids expansion power. This is also another gain factor of HEIHE-2 fuel conversion efficiency.

Further, the fluid to be injected would be preheated by a heat exchanger, so as to absorb the remaining heat from exhaust while heating up the fluid before super-heating. In this case, the heat exchanger utilized would become an energy regenerator, being applied onto the exhaust output port of the engine for heating up the incoming working fluid to be injected into the cylinders, with both of the incoming working fluid and outgoing exhaust fluid running in reversed flow directions. For even higher system integration, heat exchanger for exhaust heat energy recovery could also be implemented and integrated with engine exhaust piping system, sharing its longer exhaust fluid passage, larger heat exchange surface and physical size for better heat exchange. In this way, a large portion of heat energy from exhaust could be recovered and fed back into the cylinders of HEIHE-2.

Still in FIG. 25, in order to increase thermal efficiency and to reduce heat loss from engine block, the surface of engine block could be covered with thermal insulations 70. The super-heated fluid conduit 68 could also be coated with thermal insulation 72. Further, crowns of three pistons 17, 27 and 37 could be covered by insulation material 84, 86 and 88, as to prevent heat loss from the top side of the pistons. Cavities of three pistons could also be filled with lightweight thermal insulation material 74, 76 and 78, as to prevent heat loss from the bottom side of the pistons. Stainless steal has relative smaller heat conductivity but larger heat resistance and mechanical toughness, could become an idea insulation material for piston crowns 84, 86 and 88. At last, the pistons and connecting rods could even be made of less heat-conductive materials, such as titanium alloy. All of these thermal insulation measures would definitely contribute to the gain of HEIHE-2 fuel conversion efficiency.

Referring now to FIG. 26, a structure diagram of inter-cylinder heat conveying fluid jacket of HEIHE-2 in accordance with the present invention is shown, with its fluid circulation diagram. FIG. 26A is the cross section cutaway view; while FIG. 26B is the longitudinal cutaway view. The arrows in the figures show the flowing direction of heat conveying fluid. Inter-cylinder heat conveying fluid jacket 80 would surround the external cylinder walls of triple cylinders 11, 21 and 31. Heat conveying fluid 85 would convent around the inside of heat conveying fluid jacket 80 in two loops. The first convection loop would come upward from left side of the first cylinder 11 where "UP" is marked in FIG. 26A, travel rightward through upper portion of the first cylinder 11 and upper portion of EAV 16 toward upper portion of the third cylinder 31, then turn downward around the middle of the third cylinder 31 where "DN" is marked. Then heat conveying fluid 85 would flow downward from middle of the third cylinder 31 where "DN" is marked, travel leftward through lower portion of the third cylinder 31, lower portion of EAV 16 toward lower portion of the first cylinder 11, then turn upward around left side of the first cylinder 11 in FIG. 26B. The second convection loop would come upward from the right side of the second cylinder 21 where "UP" is marked in FIG. 26A, travel leftward through upper portion of the second cylinder 21 and upper portion of EAV 26 toward upper portion of the third cylinder 31, then turn downward around the middle of the third cylinder 31 where "DN" is marked. Then heat conveying fluid 85 would flow downward from middle of the third cylinder 31 where "DN" is marked, travel rightward through lower portion of the third cylinder 31, lower portion of EAV 26 toward lower portion of the second cylinder 21, then turn upward around right side of the second cylinder 21 in FIG. 26B.

Inter-cylinder heat conveying fluid jacket would operate around the external walls of triple cylinders. It could tend to maintain even temperature among triple cylinders by convection of heat conveying fluid, in order to feed thermal energy escaped out of the active primary cylinders back to the passive secondary cylinder. Such kind of thermal convection structure could function as an inter-cylinder thermal balancer. By means of inter-cylinder thermal balancer, the active primary cylinders could serve as a heat source of the passive secondary cylinder, resulting higher HEIHE-2 thermal efficiency, and also recapturing the escaped heat. In the other hand, the passive secondary cylinder could function as a heat drain, or a cooler of the active primary cylinders, obtaining a free cooler while getting rid of dedicated cooling system and its radiator.

In order to improve efficiency, the inner walls of inter-cylinder thermal balancer that contact heat conveying fluid could posses sloped flow channels and thermal conductive grid bars, so as to obtain passive, natural convection of heat conveying fluid. The heat conveying fluid running inside inter-cylinder thermal balancer could be conventional water based coolant. Heat resistant oil-based fluid could also be used as heat conveying fluid, such as silicone oil, mineral oil or even engine lubricate oil. The heat conveying fluid running inside inter-cylinder thermal balancer could be either passive, natural convection, or forced active circulation. Further, fluid circulation pump could be installed at low temperature section of the circulation loop to implement forced active circulation.

FIG. 27 lists a table to summarize fuel conversion efficiency related to High Efficiency Integrated Heat Engine-2 (HEIHE-2) in accordance with the present invention. The table shows up to 10 efficiency contributors that effect overall efficiency of HEIHE-2. Among these 10 efficiency contributors, 3 of them are related to power strokes that contribute to positive mechanical power output; another 3 of them are related to the structural improvements of HEIHE-2 over conventional ICE; One large, unique contributor among 10 is air hybrid braking power regeneration; and the last 3 smaller contributors among 10 are the improvements of HEIHE-2 over conventional ICE in both combustion and thermodynamics areas.

Still in FIG. 27, each efficiency contributor is listed in one line, with minimum efficiency and maximum efficiency as well as average efficiency respectively. Line 1 is primary air-fuel combustion and expansion. It takes the only power stroke of conventional ICE as a baseline, or a 100% relative efficiency as a starting point. So based on the efficiency of modern conventional gasoline ICE, 25% is entered as minimum efficiency while 30% is entered as maximum efficiency. Line 2 is secondary air-fuel combustion and expansion. It has 16% to 20% of efficiency gain to the baseline. Line 3 is combined working fluids expansion inside the third cylinder. It has 30% to 36% of efficiency gain to the baseline. Line 4 to Line 6 are contributed by removed water pump and radiator; Exhaust Actuated Valves (EAV) and Variable Compression Ratio (VCR) respectively. They are estimated to be 2% to 3% of overall efficiency increment each. Line 7 is from air hybrid braking power regeneration. Based on the efficiency gain of existing electric hybrid drivetrain over conventional ICE and the fact that air hybrid braking power regeneration may not fully effective, it is reasonable to take 15% to 25% to the baseline. Line 8 to Line 10 are contributed by in-cylinder catalytic meshes; inner-jacket fluid super-heater and engine block thermal insulation respectively. They are estimated to be 1% to 2% of overall efficiency increment each. Line 11 is the total efficiency of HEIHE-2 among the above 10 lines, resulting 49.25% minimum total efficiency, 69.30% maximum total efficiency as well as 59.28% average total efficiency. Line 12 compares the total efficiency of HEIHE-2 with the baseline efficiency from Line 1, resulting 1.97 times minimum total efficiency gain, 2.31 times maximum total efficiency gain as well as 2.14 times average total efficiency gain. Line 13 shows the total efficiency percentage gain over baseline conventional ICE efficiency from Line 1, resulting 97.00% minimum total efficiency gain, 131.00% maximum total efficiency gain as well as 114.00% average total efficiency gain. Therefore, we could confidently conclude that the total fuel conversion efficiency from HEIHE-2, as the name implies, is at least one fold over, or doubled based on, that of conventional ICE.

Figure 28:
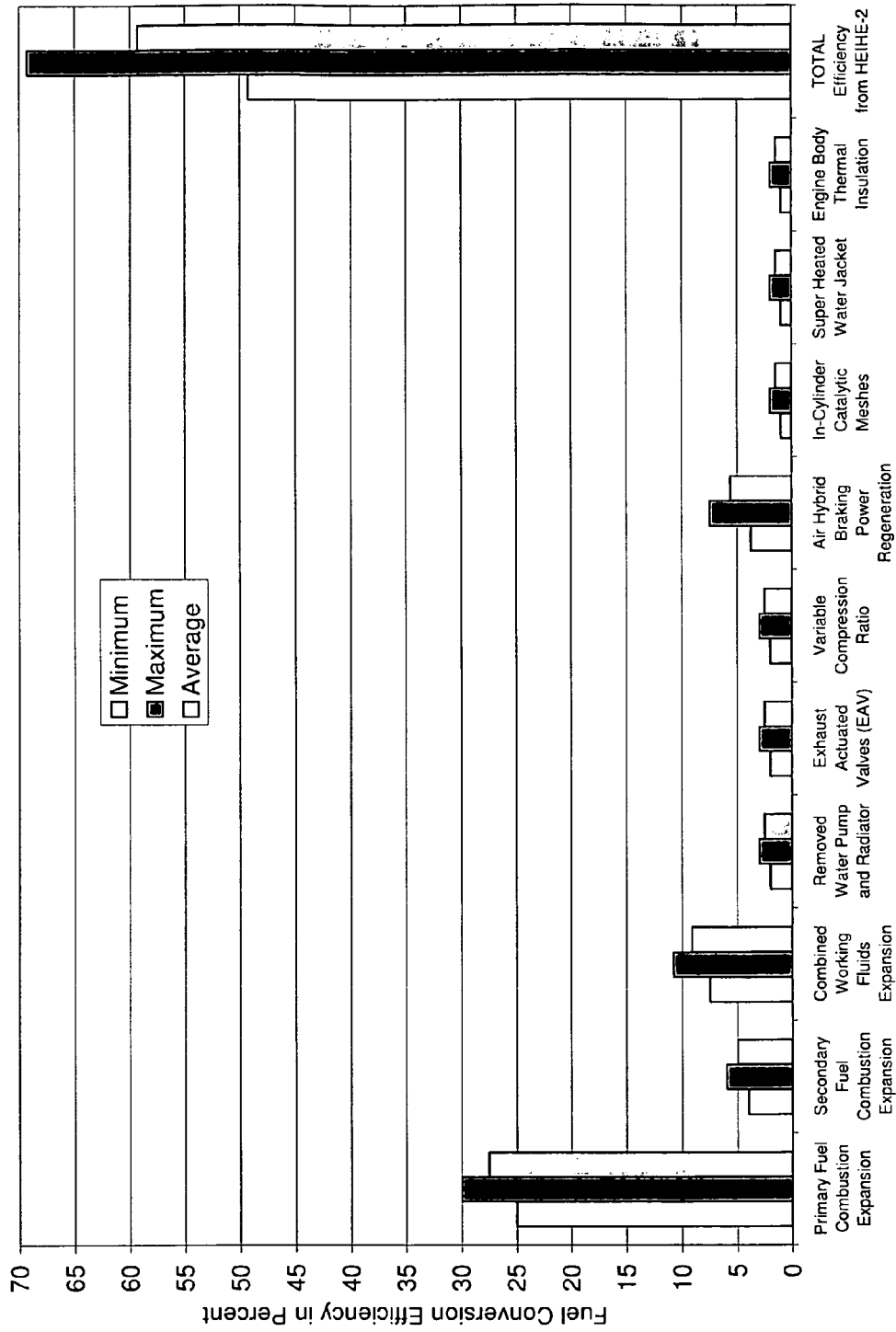
FIG. 28 is a chart of fuel conversion efficiency spectrum of HEIHE-2 in accordance with the present invention.

Referring now to FIG. 28, a fuel conversion efficiency spectrum from High Efficiency Integrated Heat Engine-2 (HEIHE-2) is shown in accordance with the present invention. In this fuel conversion efficiency spectrum chart, all the efficiency contributors listed in FIG. 27 are shown with their amounts of efficiency contributions indicated by the magnitudes of the vertical bars. The summation of all the efficiency contributors, or the total fuel conversion efficiency from HEIHE-2, is shown at the rightmost side of the chart. Obviously and conclusively, HEIHE-2 disclosed in the present invention possesses double fuel conversion efficiency over that of conventional ICE.

Advantageously, the present invention could revolutionize the conventional ICE we used to. Firstly, the present invention could reduce fuel consumption of future vehicles and power plants, basically due to higher fuel conversion efficiency. Secondly, the present invention could greatly reduce engine emissions due to staged combustion, secondary combustion and in-cylinder catalytic conversion. Thirdly, the present invention could result higher power density of future vehicles and power plants, because multiple power strokes have been integrated into one engine block. Higher power density means smaller engine size and weight, or more power based on the same engine size and weight. Fourthly, the HEIHE-2 in the present invention could be very easy to implementation that it bears the proven piston-in-cylinder structure of conventional ICE and has no over complicated engine architecture. Fifthly, the present invention could cause lower cost to build engines of future vehicles and power plants, because there is no expensive structure and parts involved. Sixthly, the present invention could be easily integrated with a "Plug-In" hybrid powertrain. And lastly, the HEIHE-2 in the present invention could be of multiple-fuel compatible, as variable compression ratio is easy to build in and staged combustion would be tolerant to wider range of air-fuel ratios.

Finally, the present invention could greatly contribute to the mankind with double engine fuel conversion efficiency. Double efficiency means less fuel consumption. Double efficiency means double fuel economy. Double efficiency means double energy. Double efficiency results cleaner environment. Double efficiency implies greater energy independent. Double efficiency results greater fossil fuel reserve. During the era of fossil fuel economy, double efficiency means stronger economy. The present invention could benefit the whole world or wherever a fuel combustion power generating engine is required, from civil automobiles to military vehicles; from engineering power horses to industry power plants; from garden tools to ocean-going vessels. The present invention could definitely meet the requirement set by California Global Warming Solutions Act 2006 (AB 32), also meet the challenge of Advanced Energy Initiative (AEI) announced by President Bush, follow the direction of Energy Act of 2007 (HR 6) signed by President Bush, and obey the guideline proposed by FreedomCAR and Vehicle Technologies (FCVT) R&D programs of US Department of Energy.

It is believed that the High Efficiency Integrated Heat Engine-2 (HEIHE-2) of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the future claims to encompass and include such changes.

What is claimed is:

1. A method for operating integrated heat engine comprising:
    operating the engine with compound cycle;
    operating the engine with combined cycle;
    integrating both compound cycle and combined cycle into single engine block;
    applying multiple working fluids into single engine block;
    constructing the engine with compound cylinder structure;
    constructing the engine with piston-in-cylinder structure;
    combusting fossil fuel inside triple compound cylinders;
    applying compound combustions inside triple compound cylinders;
    expanding working fluids inside triple compound cylinders;
    applying compound expansions inside triple compound cylinders;
    applying staged-combustion inside triple compound cylinders;
    injecting working fluids into engine cylinders;
    combining different working fluids inside triple compound cylinders;
    transferring combined working fluids between cylinders of triple compound cylinders;
    acquiring mechanical power from multiple kinds of power strokes driven by expansions of multiple working fluids;
    sharing one common secondary cylinder between two primary cylinders;
    operating the engine with greater than unity overall Lambda valve;
    combusting fossil fuel near stoichiometric point inside primary cylinders;
    oxidizing combined working fluids with greater than unity Lambda valve inside triple compound cylinders;
    integrating catalytic metal meshes into engine cylinders;
    covering piston crowns with insulation materials;
    covering engine block with insulation materials;
    recovering exhaust heat energy with heat exchanger;
    utilizing exhaust energy to actuate engine valves;
    adopting pneumatic hybrid braking energy regeneration;
    adopting compressed air as working fluid for energy regeneration;
    working under multiple stage air compressor mode;
    working under multiple stage compressed air engine mode;
    cooling compressed air under air compressor mode;
    heating compressed air under compressed air engine mode;
    storing heat energy into vacuum insulated thermos tank under air compressor mode;
    storing pneumatic energy into compressed air reservoir under air compressor mode;
    releasing stored heat energy for energy regeneration under compressed air engine mode;
    releasing stored pneumatic energy for energy regeneration under compressed air engine mode;
    charging heat energy through "plug-in" to household electrical power source; and
    charging pneumatic energy through "plug-in" to household electrical power source.

2. The method according to claim 1, wherein said triple compound cylinder structure comprises at least one, but not limited to one, bank of triple compound cylinders;
    wherein said triple compound cylinders comprise three adjacent cylinders, the first cylinder, the second cylinder and the third cylinder;
    wherein said triple compound cylinders are contained within single engine block;
    wherein the first cylinder and the third cylinder are cascaded for working fluid transfer;
    wherein the second cylinder and the third cylinder are cascaded for working fluid transfer;
    wherein the third cylinder seats between the first cylinder and the second cylinder;
    wherein the volumes of the first cylinder and the second cylinder are identical;
    wherein the volume of the third cylinder is larger than the volume of the first cylinder;
    wherein the volume of the third cylinder is larger than the volume of the second cylinder;
    wherein fluid transfer channel is built between the first cylinder and the third cylinder; and
    wherein fluid transfer channel is built between the second cylinder and the third cylinder.

3. The method according to claim 1, wherein said multiple working fluids comprise at least two, but not limited to two, kinds of working fluids among air-fuel combustion products, steam, compressed steam, compressed air and combined working fluids;
    wherein said combined working fluids comprise mixture of air-fuel combustion products plus at least one, but not limited to one, kind of working fluid among steam, compressed steam, compressed air or any other gaseous fluid; and
    wherein said combined working fluids may comprise, but not limited to, phase change resultant of liquid water, liquid air or liquid nitrogen.

4. The method according to claim 1, wherein said compound combustions comprise primary air-fuel combustion in the first cylinder, primary air-fuel combustion in the second cylinder; and secondary air-fuel combustion in the first cylinder, secondary air-fuel combustion in the second cylinder, and secondary air-fuel combustion in the third cylinder; and
    wherein said compound expansions comprise primary combustion products expansion in the first cylinder; primary combustion products expansion in the second cylinder, and combined working fluids expansion in the first cylinder, combined working fluids expansion in the second cylinder, as well as combined working fluids expansion in the third cylinder.

5. The method according to claim 1, wherein said multiple kinds of power strokes comprise at least two different kinds of power strokes:
  (a) primary power stroke—primary air-fuel combustion and combustion products expansion in either the first cylinder or the second cylinder; and
  (b) secondary power stroke—secondary air-fuel combustion and combustion products expansion in the third cylinder; plus combined working fluids expansion in the third cylinder.

6. The method according to claim 1, wherein the full working cycle of the engine comprises six (6) kinds of operation strokes scheduled in four (4) working periods, during each working period three (3) different operation strokes happen at the same time in the first cylinder, the second cylinder and the third cylinder respectively; and
  wherein four different of power strokes are included among said four (4) working periods, while only two of said four power strokes consume fossil fuel.

7. The method according to claim 1, wherein the full working cycle of six (6) kinds of operation strokes scheduled in four (4) working periods comprises two (2) complete crankshaft revolutions, or 720 degree crankshaft angle, each period comprising 180 degree crankshaft angle with three (3) of said six (6) operation strokes:
  (a) the first period, intake stroke happens in the first cylinder, exhaust stroke happens in the third cylinder and primary power stroke happens in the second cylinder;
  (b) the second period, compression stroke happens in the first cylinder, secondary power stroke happens in the third cylinder and transfer stroke happens in the second cylinder;
  (c) the third period, primary power stroke happens in the first cylinder, exhaust stroke happens in the third cylinder and intake stroke happens in the second cylinder; and
  (d) the fourth period, transfer stroke happens in the first cylinder, secondary power stroke happens in the third cylinder and compression stroke happens in the second cylinder.

8. The method according to claim 1, wherein one spark ignition is applied onto the first cylinder during 300 degree to 400 degree of crankshaft angle; one spark ignition is applied onto the second cylinder during 660 degree to 40 degree of crankshaft angle;
  wherein multiple spark ignitions are applied onto both the first cylinder and the third cylinder during 540 degree to 630 degree of crankshaft angle; multiple spark ignitions are applied onto both the second cylinder and the third cylinder during 180 degree to 360 degree of crankshaft angle;
  wherein one or multiple fluid injections are applied into the first cylinder during 450 degree to 630 degree of crankshaft angle; one or multiple fluid injections are applied into the second cylinder during 90 degree to 270 degree of crankshaft angle; and
  wherein the fluid to be injected into the first cylinder or the second cylinder is purified water, distilled water, compressed steam, compressed air, liquid air, or liquid nitrogen, as well as any phase change resultant of all these fluids.

9. The method according to claim 1, wherein said staged-combustion is implemented by applying different air-fuel ratios into said triple compound cylinders, with fuel-rich air-fuel mixture being applied firstly to the first cylinder or the second cylinder, and then, with oxygen-rich working fluids being applied secondly to the third cylinder;
  wherein said fuel-rich air-fuel mixture is generated by injecting more fossil fuel than stoichiometric requirement;
  wherein said oxygen-rich working fluids is generated by injecting oxygen-rich fluid into primary combustion products;
  wherein the oxygen-rich fluid to be injected is compressed air or liquid air;
  wherein the injected oxygen-rich fluid inside the combustion chambers of triple cylinders provides additional oxidizer for secondary combustion; and
  wherein said secondary combustion is an oxygen-rich lean burn.

10. The method according to claim 1, wherein said exhaust heat energy recovery is implemented by applying heat exchanger onto the exhaust output port of the engine for heating up the incoming working fluid to be injected into the cylinders;
  wherein both the incoming working fluid and outgoing exhaust fluid inside said heat exchanger for exhaust heat energy recovery are running in reversed flow directions; and
  wherein said heat exchanger for exhaust heat energy recovery is implemented and integrated with engine exhaust piping system.

11. The method according to claim 1, wherein said air compressor mode comprises two-stage air compression process, with the third cylinder working at primary compression stage, while the first cylinder, working at secondary compression stage; a full working cycle of the air compressor mode comprises 4 strokes scheduled in 2 periods, covering 360 degree of crankshaft rotation:
  (a) the first period, intake stroke happens in the third cylinder, and compression stroke happens in the first cylinder; and
  (b) the second period, pre-charge stroke happens in the third cylinder, and charge stroke happens in the first cylinder.

12. The method according to claim 1, wherein said compressed air engine mode comprises two-stage compressed air expansion process, with the first cylinder, or both the first and the second cylinder, working at primary expansion stage, while the second cylinder working at secondary expansion stage; a full working cycle of the compressed air engine mode comprises 4 strokes scheduled in 2 periods, covering 360 degree of crankshaft rotation:
  (a) the first period, primary compressed air engine power stroke happens in the first cylinder, or both the first and the second cylinder, and compressed air engine exhaust stroke happens in the third cylinder; and
  (b) the second period, compressed air engine transfer stroke happens in the first cylinder, or both the first and the second cylinder, and secondary compressed air engine power stroke happens in the third cylinder.

13. The method according to claim 1, wherein the stored energies can be pre-charged electrically through "plug-in" to household electrical power source;
  wherein the pneumatic energy charged into compressed air reservoir is sourced from either braking power regeneration, or "plug-in" to household powered compressed air source; and
  wherein the heat energy charged into thermos tank is sourced from either braking power regeneration, or "plug-in" to household electrical power source.

14. An integrated heat engine comprising:
  means for operating the engine with compound cycle;
  means for operating the engine with combined cycle;

means for integrating both compound cycle and combined cycle into single engine block;

means for applying multiple working fluids into single engine block;

means for constructing the engine with compound cylinder structure;

means for constructing the engine with piston-in-cylinder structure;

means for combusting fossil fuel inside triple compound cylinders;

means for applying compound combustions inside triple compound cylinders;

means for expanding working fluids inside triple compound cylinders;

means for applying compound expansions inside triple compound cylinders;

means for applying staged-combustion inside triple compound cylinders;

means for injecting working fluids into engine cylinders;

means for combining different working fluids inside triple compound cylinders;

means for transferring combined working fluids between cylinders of triple compound cylinders;

means for acquiring mechanical power from multiple kinds of power strokes driven by expansions of multiple working fluids;

means for sharing one common secondary cylinder between two primary cylinders;

means for operating the engine with greater than unity overall Lambda valve;

means for combusting fossil fuel near stoichiometric point inside primary cylinders;

means for oxidizing combined working fluids with greater than unity Lambda valve inside triple compound cylinders;

means for integrating catalytic metal meshes into engine cylinders;

means for covering piston crowns with insulation materials;

means for covering engine block with insulation materials;

means for recovering exhaust heat energy with heat exchanger;

means for utilizing exhaust energy to actuate engine valves;

means for adopting pneumatic hybrid braking energy regeneration;

means for adopting compressed air as working fluid for energy regeneration;

means for working under multiple stage air compressor mode;

means for working under multiple stage compressed air engine mode;

means for cooling compressed air under air compressor mode;

means for heating compressed air under compressed air engine mode;

means for storing heat energy into vacuum insulated thermos tank under air compressor mode;

means for storing pneumatic energy into compressed air reservoir under air compressor mode;

means for releasing stored heat energy for energy regeneration under compressed air engine mode;

means for releasing stored pneumatic energy for energy regeneration under compressed air engine mode;

means for charging heat energy through "plug-in" to household electrical power source; and means for charging pneumatic energy through "plug-in" to household electrical power source.

15. An integrated heat engine comprising:

engine body (1) holding a plurality of triple compound cylinders;

triple compound cylinder composed by the first cylinder (11) with a first piston (17) and its connecting rod (18); the second cylinder (21) with a second piston (27) and its connecting rod (28);

and the third cylinder (31) with a third piston (37) and its connecting rod (38);

both the first piston (17) and the third piston (37) are mechanically coupled with the crankshaft (19) by their connecting rods in a crankshaft angle difference from zero degree to 270 degree; both the second piston (27) and the third piston (37) are mechanically coupled with the crankshaft (19) by their connecting rods in a crankshaft angle difference from zero degree to 270 degree; and both the first piston (17) and the second piston (27) are mechanically coupled with the crankshaft (19) by their connecting rods in a crankshaft angle difference from negative 45 degree to positive 45 degree;

on top of the first cylinder (11), at least one set of storage valve (12), spark plug (13), fluid injector (14) and charge valve (15) are installed;

on top of the second cylinder (21), at least one set of power boost valve (22), spark plug (23), fluid injector (24) and intake valve (25) are installed;

on top of the third cylinder (31), at least one set of pre-charge valve (32) spark plug (33) and intake valve (35) are installed; and at least one assembly of inter-cylinder working fluid transfer valve (16) is mounted between the first cylinder (11) and the third cylinder (31); at least one assembly of inter-cylinder working fluid transfer valve (26) is mounted between the second cylinder (21) and the third cylinder (31); at least one assembly of exhaust valve (36) is mounted between the third cylinder (31) and exhaust port (38).

16. The engine according to claim 15, further comprising wide band oxygen sensor at exhaust port (38) and engine control electronic module, with the upper working range of wide band oxygen sensor being infinity Lambda value, or up to oxygen content of pure air;

means for closing fuel control loop with wide band oxygen sensor signal; means for controlling the amount of fuel injection and the amount of secondary fluid injection with closed feedback loop.

17. The engine according to claim 15, wherein the first cylinder, the second cylinder and the third cylinder comprise catalytic metal meshes (61) (62) and (63) built into their combustion chambers; means to make the third cylinder work as a thermal reactor, or gaseous pollutants remover; the crowns of the first piston, the second piston and the third piston are covered by thermal insulation materials (84), 86) and (88); the cavities of triple pistons are filled by lightweight thermal insulation materials (74), (76) and (78); the outer surface of engine block is covered with thermal insulations (70), or by thermal coating.

18. The engine according to claim 15, wherein the first cylinder, the second cylinder and the third cylinder share one inter-cylinder heat conveying fluid jacket (80); the heat conveying fluid (85) within said heat conveying fluid jacket is silicon oil, mineral oil or even engine lubricate oil; the heat conveying fluid is circulated passively, or forced actively by circulation pump running at the lower temperature section of the circulation loop;

wherein the flow directions of said circulation loops are heated fluid at top areas of said fluid jacket traveling from the first cylinder to the third cylinder, or from the second cylinder to the third cylinder, while cooled fluid at bottom areas of said fluid jacket traveling in opposite, off-center directions; and wherein fluid super-heaters are inserted into the hottest section of the conveying fluid jacket near top areas of the first cylinder and the second cylinder.

19. The engine according to claim 15, wherein said inter-cylinder working fluid transfer valves (16), (26) and exhaust valve (36) are implemented by piston valves actuated by exhaust energy, or exhaust actuated valve (EAV). EAV comprises at least EAV pressure chamber (10), upper EAV cylinder (42), lower EAV cylinder (45), EAV piston (43) with fluid transfer opening (44) and its driving head (46), exhaust duct (47), vent hole (48), working fluid transfer passage (49), switching valve (41) and check valve (40); and means for controlling switching valve (41) to reset EAV by a microcomputer or engine control electronic module.

20. The engine according to claim 15, further comprising compressed air reservoir (9); the first heat exchanger (7) and the second heat exchanger (8) cascaded in two stages; fluid ducts (58), (60) and (62); fluid duct insulations (59) and (61); bi-directional fluid circulation pump (54), and vacuum insulated thermos tank (56); means for utilizing silicon oil, mineral oil or even engine lubricate oil as heat conveying fluid (55); means for circulating heat conveying fluid (55) in a closed loop from bottom of thermos tank (56), to fluid circulation pump (54), to second heat exchanger (8), to first heat exchanger (7), then return to top of thermos tank under the air compressor working mode; and means for circulating heat conveying fluid (55) in a closed loop from top of thermos tank (56), to the first heat exchanger (7), to second heat exchanger (8), to fluid circulation pump (54), then return to bottom of thermos tank under the compressed air engine working mode.

* * * * *